US012809548B2

(12) United States Patent
Nagao et al.

(10) Patent No.: US 12,809,548 B2
(45) Date of Patent: Nov. 24, 2026

(54) STORAGE APPARATUS HAVING PARITY GROUPS

(71) Applicant: Hitachi Vantara, Ltd., Yokohama (JP)

(72) Inventors: Takashi Nagao, Tokyo (JP); Hiroka Ihara, Tokyo (JP); Tomohiro Yoshihara, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 19/070,757

(22) Filed: Mar. 5, 2025

(65) Prior Publication Data

US 2026/0037175 A1 Feb. 5, 2026

(30) Foreign Application Priority Data

Jul. 30, 2024 (JP) ................................ 2024-123558

(51) Int. Cl.
*G06F 3/06* (2006.01)

(52) U.S. Cl.
CPC .......... *G06F 3/0655* (2013.01); *G06F 3/0625* (2013.01); *G06F 3/0679* (2013.01)

(58) Field of Classification Search
CPC ..... G06F 3/0655; G06F 3/0625; G06F 3/0689
See application file for complete search history.

(56) References Cited

U.S. PATENT DOCUMENTS 9,158,466 B1 * 10/2015 Sahin .................... G06F 3/0625
10,082,965 B1 * 9/2018 Tamilarasan ............ G06F 12/00
2010/0023685 A1 1/2010 Ikejiri et al.
2013/0046945 A1 * 2/2013 Abe ...................... G06F 3/0611 711/E12.103
2019/0129647 A1 * 5/2019 Gong .................... G06F 3/0647
2026/0010432 A1 * 1/2026 Alsalim .............. G06F 11/1088

FOREIGN PATENT DOCUMENTS

JP 2010-033261 A 2/2010
JP 2013-41394 A 2/2013

OTHER PUBLICATIONS

Japanese Office Action received in corresponding Japanese Application No. 2024-123558 dated Feb. 17, 2026.

* cited by examiner

*Primary Examiner* — Edward J Dudek, Jr.
(74) *Attorney, Agent, or Firm* — MATTINGLY & MALUR, PC

(57) ABSTRACT

A storage apparatus includes a plurality of physical drives and a storage controller configured to control access to the physical drives. The storage controller records statistical information related to data write of each of the plurality of physical drives, and executes a replacement process between one or more first physical drives in a non-power saving state and one or more second physical drives in a power saving state, the second physical drives being different from the first physical drives and the statistical information indicating fewer writes than the first physical drives. The replacement process includes setting the second physical drives to the non-power saving state, moving data from the first physical drives to the second physical drives set in the non-power saving state, and setting the first physical drives from which the data has been moved to the power saving state.

12 Claims, 19 Drawing Sheets

FIG. 4

20

| 21 | 22 | 23 | 24 | 25 | 26 |
|---|---|---|---|---|---|
| VIRTUAL PARITY GROUP NUMBER | VIRTUAL DRIVE NAME | ADDRESS OF VIRTUAL DRIVE | DISTRIBUTED PARITY GROUP NUMBER | INTRA-DISTRIBUTED-PARITY-GROUP DRIVE SERIAL NUMBER | ADDRESS OF PHYSICAL DRIVE |
| 1 | D1 | 0x00000000 | 1 | 5 | 0x00000000 |
| 1 | D2 | 0x00000000 | 1 | 2 | 0x00000000 |
| 1 | D3 | 0x00000000 | 1 | 3 | 0x00000000 |
| 1 | P1 | 0x00000000 | 1 | 4 | 0x00000000 |
| 2 | D2 | 0x00000000 | 1 | 4 | 0x10000000 |

FIG. 5

30

31 32 33 34

| PAGE NUMBER | VIRTUAL PARITY GROUP NUMBER | VIRTUAL DRIVE NAME | INTRA-VIRTUAL DRIVE ADDRESS |
|---|---|---|---|
| 1 | 1 | D1 | 0x10000000 |
| 2 | 2 | D2 | 0x30000000 |

FIG. 6

40

41 42 43 44

| LUN NUMBER | LUN ADDRESS | PAGE UNIT EXCLUSION | PAGE NUMBER |
|---|---|---|---|
| 1 | 0x00000000 | No | 10 |
| 1 | 0x00010000 | Yes | 1 |

FIG. 7

50

| PHYSICAL DRIVE NAME (51) | DRIVE STATE (52) | DISTRIBUTED PARITY GROUP NUMBER (53) | INTRA-DISTRIBUTED-PARITY-GROUP DRIVE SERIAL NUMBER (54) | EXCESS NUMBER OF TIMES OVER WRITE THRESHOLD VALUE (55) |
|---|---|---|---|---|
| A | REPLACEMENT SOURCE PREPARATION STATE | 1 | 1 | 1000 |
| B | ACCESSIBLE STATE | 1 | 2 | 800 |
| C | ACCESSIBLE STATE | 1 | 3 | 950 |
| D | ACCESSIBLE STATE | 1 | 4 | 400 |
| E | REPLACEMENT DESTINATION PREPARATION STATE | 1 | 1 | 100 |
| F | POWER SAVING STATE | NONE | NONE | 700 |

FIG. 11

70

| REPLACEMENT SOURCE DRIVE NAME (71) | REPLACEMENT DESTINATION DRIVE NAME (72) | SWITCHED ADDRESS (73) |
|---|---|---|
| G | H | 0xFFFFFFF0 |
| A | E | 0x66666666 |

FIG. 17

80

| PARITY GROUP NUMBER (81) | PARITY GROUP STATE (82) | DRIVE NAME (83) | EXCESS NUMBER OF TIMES OVER WRITE THRESHOLD VALUE (84) |
|---|---|---|---|
| 1 | REPLACEMENT SOURCE PREPARATION STATE | A, B, C, D | 1000 |
| 2 | ACCESSIBLE STATE | E, F, G, H | 800 |
| 5 | REPLACEMENT DESTINATION PREPARATION STATE | Q, R, S, T | 100 |
| 6 | POWER SAVING STATE | U, V, W, X | 700 |

FIG. 19

90

| PAGE NUMBER (31) | PARTY GROUP NUMBER (32) | INTRA-PARTY-GROUP ADDRESS (33) | DATA WRITE FREQUENCY (94) |
|---|---|---|---|
| 1 | 1 | 0x10000000 | HIGH |
| 2 | 2 | 0x30000000 | LOW |

STORAGE APPARATUS HAVING PARITY GROUPS

CLAIM OF PRIORITY

The present application claims priority from Japanese patent application JP 2024-123558 filed on Jul. 30, 2024, the content of which is hereby incorporated by reference into this application.

BACKGROUND OF THE INVENTION

1. Field of the Invention

The present invention relates to a storage apparatus that suppresses power consumption by using a power saving state of a drive.

2. Description of the Related Art

In recent years, with increasing environmental awareness in the IT industry, there is a demand for reduction in power consumption of servers and storage apparatuses operated in data centers.

In particular, in a storage apparatus for mission critical applications equipped with a large-capacity drive, the power consumption of the drive occupies a large proportion of the power consumption of the entire storage apparatus, and thus reduction in the power consumption of the drive is important in reducing the power consumption of the entire storage apparatus.

In general, a storage apparatus having a thin provisioning (capacity virtualization) function combines physical storage areas distributed on a plurality of drives to provide a virtual storage area called a thin provisioning pool.

Hereinafter, the virtual storage area provided by the storage apparatus having the thin provisioning function is simply referred to as a pool.

Since the business data stored in the pool continues to increase every day, in general, at the time of creating the pool, a sufficient free space is secured in addition to the amount of business data at that time point.

JP 2010-33261 A discloses a storage apparatus that reduces power consumption of a drive by biasing data arrangement in a pool to some drives and shifting the drive in which no data is arranged to a power saving state.

SUMMARY OF THE INVENTION

In recent years, a solid state drive (SSD) has been widely used as a drive mounted on a storage apparatus in addition to a hard disk drive (HDD).

Unlike the HDD, in the SSD, an insulator used for storing data deteriorates due to writing of data, and eventually data cannot be read or written.

JP 2010-33261 A does not take into consideration that, in a case where an SSD is mounted in a storage apparatus, data write to a drive is increased by biasing data arrangement to some drives, and a drive failure is likely to occur.

A storage apparatus according to one aspect of the present invention includes a plurality of physical drives; and a storage controller configured to control access to the plurality of physical drives, wherein the storage controller is configured to record statistical information related to data write of each of the plurality of physical drives, and execute a replacement process between one or more first physical drives in a non-power saving state and one or more second physical drives in a power saving state, the one or more second physical drives being different from the first physical drives and having the statistical information indicating fewer writes than the one or more first physical drives; and the replacement process includes setting the one or more second physical drives to the non-power saving state, moving data from the one or more first physical drives to the one or more second physical drives set in the non-power saving state; and setting the one or more first physical drives from which the data has been moved to the power saving state.

According to one aspect of the present invention, the power consumption of the drive can be reduced while suppressing the frequency of drive failure.

BRIEF DESCRIPTION OF THE DRAWINGS

FIG. 4 is a diagram illustrating a configuration of parcel mapping according to the first example;

FIG. 5 is a diagram illustrating a configuration of a page management table according to the first example;

FIG. 6 is a diagram illustrating a configuration of an address conversion table according to the first example;

FIG. 7 is a diagram illustrating a configuration of a drive operation control table according to the first example;

FIG. 11 is a diagram illustrating a configuration of a drive replacement progress management table according to the first example;

FIG. 17 is a diagram illustrating a configuration of a parity group operation control table according to the second example;

FIG. 19 is a diagram illustrating a configuration of a page management table according to a third example.

DESCRIPTION OF THE PREFERRED EMBODIMENTS

Figure 1:
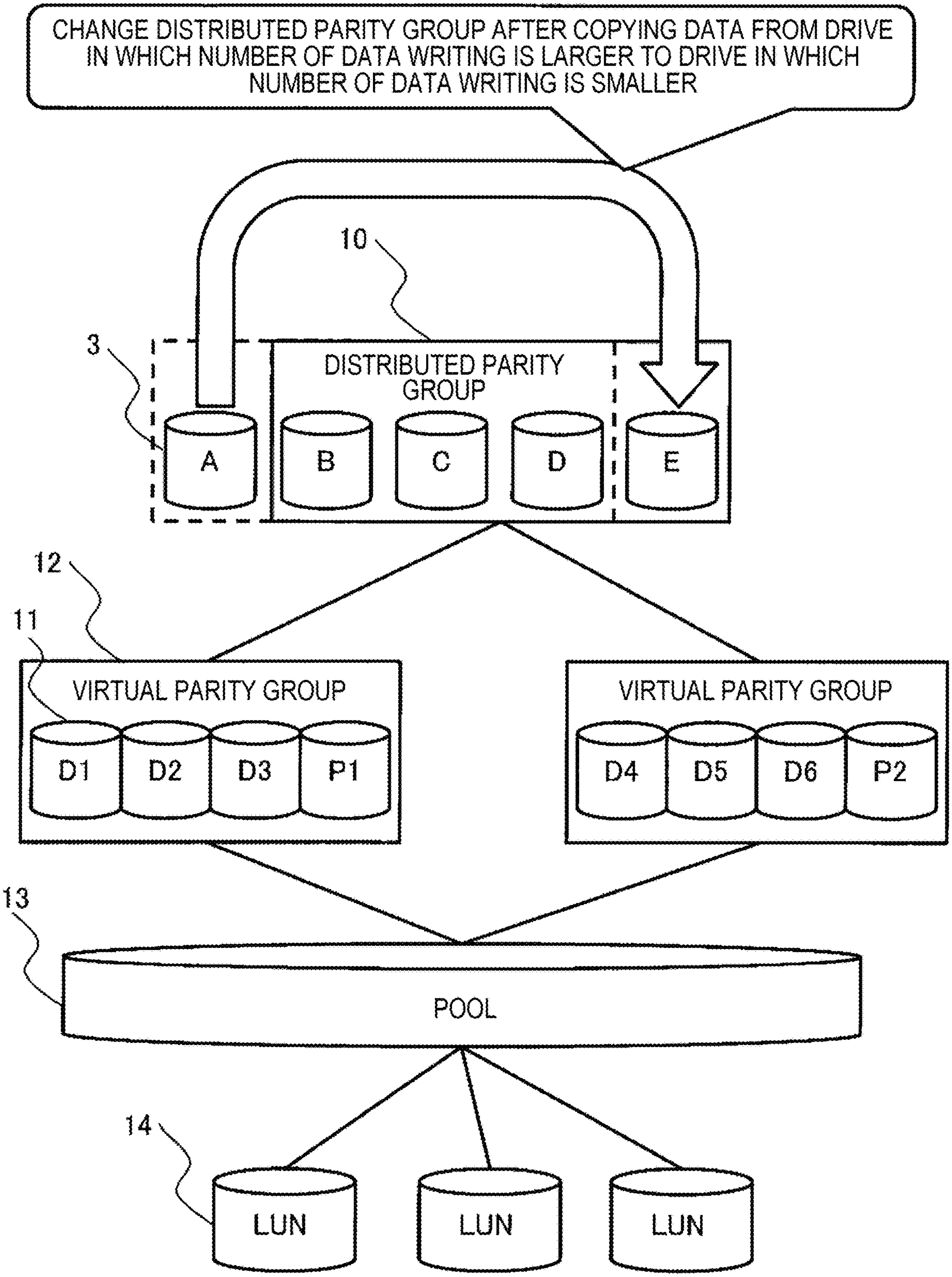
FIG. 1 is a diagram illustrating a concept of a leveling process of number of drive writes using a distributed parity group.

Hereinafter, examples of the present invention will be described with reference to the drawings. However, the present invention is not to be construed as being limited to the described content of the following examples. Those skilled in the art can easily understand that the specific configuration can be changed without departing from the spirit or gist of the present invention.

Notations such as "first", "second", and "third" in the present specification and the like are given to identify components, and do not necessarily limit the number or order.

In the configurations of the invention described below, the same or similar configurations or functions are denoted by the same reference numerals, and redundant description will be omitted.

In addition, in the following description, in a case where the same type of elements are described without being distinguished, a common reference numeral (or a reference numeral) may be used in the reference numerals, and in a case where the same type of elements are described in a distinguished manner, a reference numeral (or an element ID) may be used.

In the following description, "LUN" means a logical drive or volume, and is mapped to some storage areas or all the storage areas of the pool. That is, the LUN includes some storage areas or all the storage areas of the pool. A host executes an I/O (Input/Output) request to the "LUN". The LUN is a logical volume. Allocation of the storage area is managed via a pool between the LUN and the storage area of a storage drive.

A program is executed by a processor (e.g., central processing unit (CPU)) included in a storage controller in the storage apparatus to appropriately perform predetermined processing using a storage resource (e.g., memory) and/or a communication interface device (e.g., host I/F), so that a subject of the process may be the storage apparatus or the processor. In addition, the storage controller may include a hardware circuit that performs a part of or all of the processing. The computer program may be installed from a program source. The program source may be, for example, a program distribution server or a computer readable storage medium.

A storage apparatus according to one example of the present specification records statistical information regarding data write of a mounted drive, and selects a drive in a power saving state in which data write is small and a drive in a non-power saving state (normal state) in which data write is large. The storage apparatus compares the data write of the selected drives, and releases the power saving state of the drive with less data write when the difference between the compared data write is larger than a threshold value. Furthermore, the data is moved from the drive in which the data write is large to the drive in which the data write is small, and the power saving state is set to the drive in which the data write is larger.

First Example

An example of a system for configuring a highly reliable storage area from a plurality of drive capacities called a distributed RAID (Redundant Array of Inexpensive Disks) will be described.

The distributed RAID is a data protection scheme in which a parity group configured by physical drives in a general RAID (also referred to as a conventional RAID) is replaced with a virtual parity group configured between virtual drives, and data of the virtual parity group is stored in the physical drives in a distributed manner, so that the number of physical drives can be determined independently of the RAID redundancy.

In the present example, a means such as stopping power supply to the physical drive is applied in units of one physical drive, and a large power consumption reduction effect can be obtained. Note that the physical drive may be set to the power saving state while maintaining power supply to the physical drive.

First, an outline of a concept of the distributed RAID and an operation of the present patent will be described with reference to FIG. 1.

Among the elements described in FIG. 1, five physical drives 3 (A, B, C, D, E) are physical existence, and the remaining elements are logical existence in the storage apparatus. Each will be described.

In the distributed RAID, the storage apparatus configures a distributed parity group 10 from a plurality of physical drives 3. The storage apparatus divides the storage areas of the physical drives 3 into units called parcels (see FIG. 3). Next, virtual continuous addresses are given to parcels of a plurality of physical drives 3 to configure virtual drives 11.

In the conventional RAID, the storage areas of the physical drives 3 belonging to the parity group are collectively configured in a cross-sectional manner, whereas in the distributed RAID, the parcel configuring the virtual drive 11 is selected from an arbitrary physical drive 3. Therefore, although the number of physical drives 3 belonging to the distributed parity group 10 is limited to the minimum number for the redundant configuration, the number of physical drives 3 can be increased or decreased in units of one.

Next, the storage apparatus 1 configures a virtual parity group 12 from a plurality of virtual drives 11. The number of virtual drives 11 of the virtual parity group 12 is less than or equal to the number of physical drives 3 belonging to the distributed parity group 10. Furthermore, in the example described below, the number of virtual parity groups 12 configured by one distributed parity group 10 matches the number of physical drives 3 of the distributed parity group. The virtual parity group 12 realizes high reliability by making data redundant by a conventional RAID technology.

Subsequently, the storage apparatus registers the virtual parity group 12 in a pool 13. This may be a method of registering an LUN 14 created from the virtual parity group 12 in the pool 13 according to design matters of the storage apparatus.

Furthermore, the storage apparatus defines the LUN 14 from the pool 13 and provides the same to a host 9.

When the host 9 issues a data write request to the LUN 14, the storage apparatus corresponds the storage area of the virtual parity group 12 registered in the pool 13 with respect to the address space of the write destination of the LUN 14 in a unit called a page 16. Then, the storage apparatus calculates corresponding storage areas in the order of the virtual parity group 12, the virtual drive 11, the distributed parity group 10, and the physical drive 3, and writes data received from the host 9 to the calculated storage area of the physical drive 3.

Here, the amount of data written to the LUN 14 has a property of increasing every day with an increase in a service providing time provided by the host 9 and the number of users. Therefore, in installation of the storage apparatus, the physical drive 3 is often mounted so as to have a capacity sufficiently larger than the data amount of the LUN 14 at that time. That is, in many cases, there is a free space in each physical drive 3 of the storage apparatus.

Therefore, the storage apparatus prepares the virtual drive 11 in which no data is stored by moving the data of the virtual drive 11 belonging to the virtual parity group 12 registered in the pool 13 to some of the virtual drives 11. Then, by deleting the virtual drive 11, removing some physical drives 3 from the distributed parity group 10, and setting the removed physical drives 3 to the power saving state, the power consumption of the physical drives can be suppressed.

The setting to the power saving state includes, for example, use of an autonomous power state transition (APST) which is a function provided by the SSD. In the use of the APST, the data read/write speed of the physical drive decreases, but the power consumption can be suppressed in a state where data can be read/written.

In addition, the setting to the power saving state includes, for example, stop of power supply from the storage apparatus to the physical drive 3. In this method, although it takes time until the physical drive 3 becomes a state in which data read/write is enabled, power consumption can be greatly suppressed. In the present example, read/write of data of the removed physical drive 3 is not necessary, and hence the method of setting the power saving state may be either of the above methods.

FIG. 1 illustrates an outline of a case where the storage apparatus performs the operation for leveling the drive life from a situation in which the physical drive E is removed from the distributed parity group 10 and set to the power saving state.

When a data write request to the LUN 14 is received, the storage apparatus writes data to four physical drives A, B, C, and D.

Here, in the SSD, an insulator used for storing data deteriorates due to data write, and a drive failure eventually occurs. An SSD vendor discloses a standard value of the data write amount so that the drive failure due to the data write can be avoided from occurring earlier than the service life assumed by the SSD vendor. Examples of the standard value include drive write per day (DWPD).

On the other hand, the SSD is faster in read/write of data than the HDD, and adverse effects due to data movement between physical drives can be suppressed small in the SSD than in the HDD.

In FIG. 1, data write does not occur in the physical drive E, and data write is concentrated on four physical drives A, B, C, and D. The storage apparatus monitors the number of times the daily data write amount of the five physical drives exceeds the threshold value, and specifies the physical drive A having a large number of times of exceeding the threshold value and the physical drive E having a small number of times of exceeding the threshold value in the power saving state.

Next, the storage apparatus releases the power saving state of the physical drive E, and performs data copy from the physical drive A to the physical drive E. Subsequently, the physical drive A is excluded from the distributed parity group 10, and the physical drive E is taken in. Then, the physical drive A is set to the power saving state.

As described above, data write to the physical drive A is eliminated, and reduction in the power consumption by the drive in the power saving state can be realized while preventing the occurrence of the drive failure due to the data write in the physical drive A.

Hereinafter, details of the present example will be described.

Figure 2:
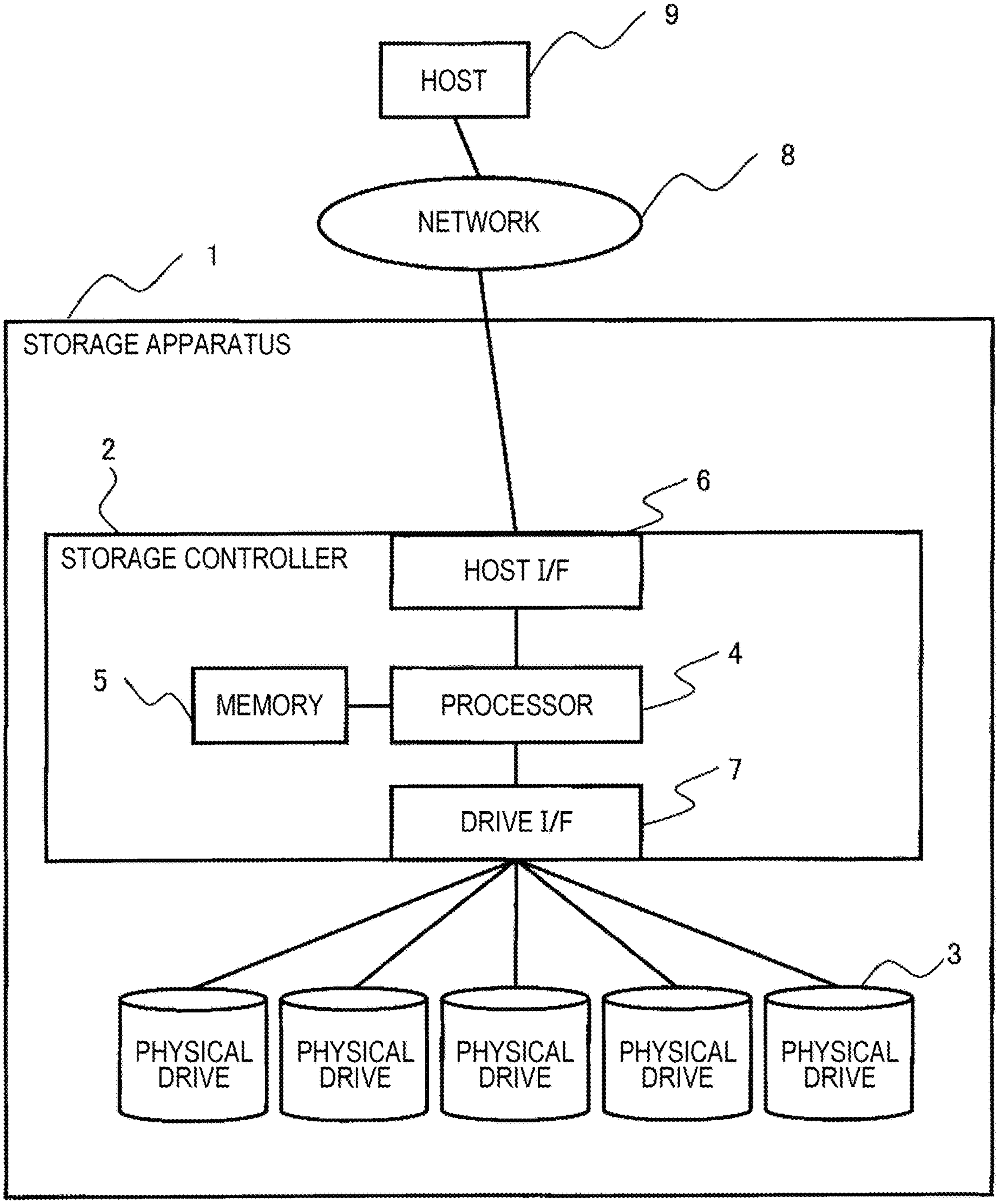
FIG. 2 is a diagram illustrating a configuration of a storage apparatus.

An example of a configuration of the storage apparatus 1 in which the present example is performed will be described with reference to FIG. 2.

The storage apparatus 1 includes a storage controller 2 and a physical drive 3.

The storage controller 2 includes a processor 4, a memory 5, a host I/F 6, and a drive I/F 7, and is connected to the physical drive 3 via the drive I/F 7.

In addition, the storage controller 2 is connected to a network 8 via the host I/F 6. The host 9 is connected to the network 8.

Next, an outline of the storage areas of the physical drive 3 and the virtual drive 11 in the distributed RAID will be described using FIG. 3.

Figure 3:
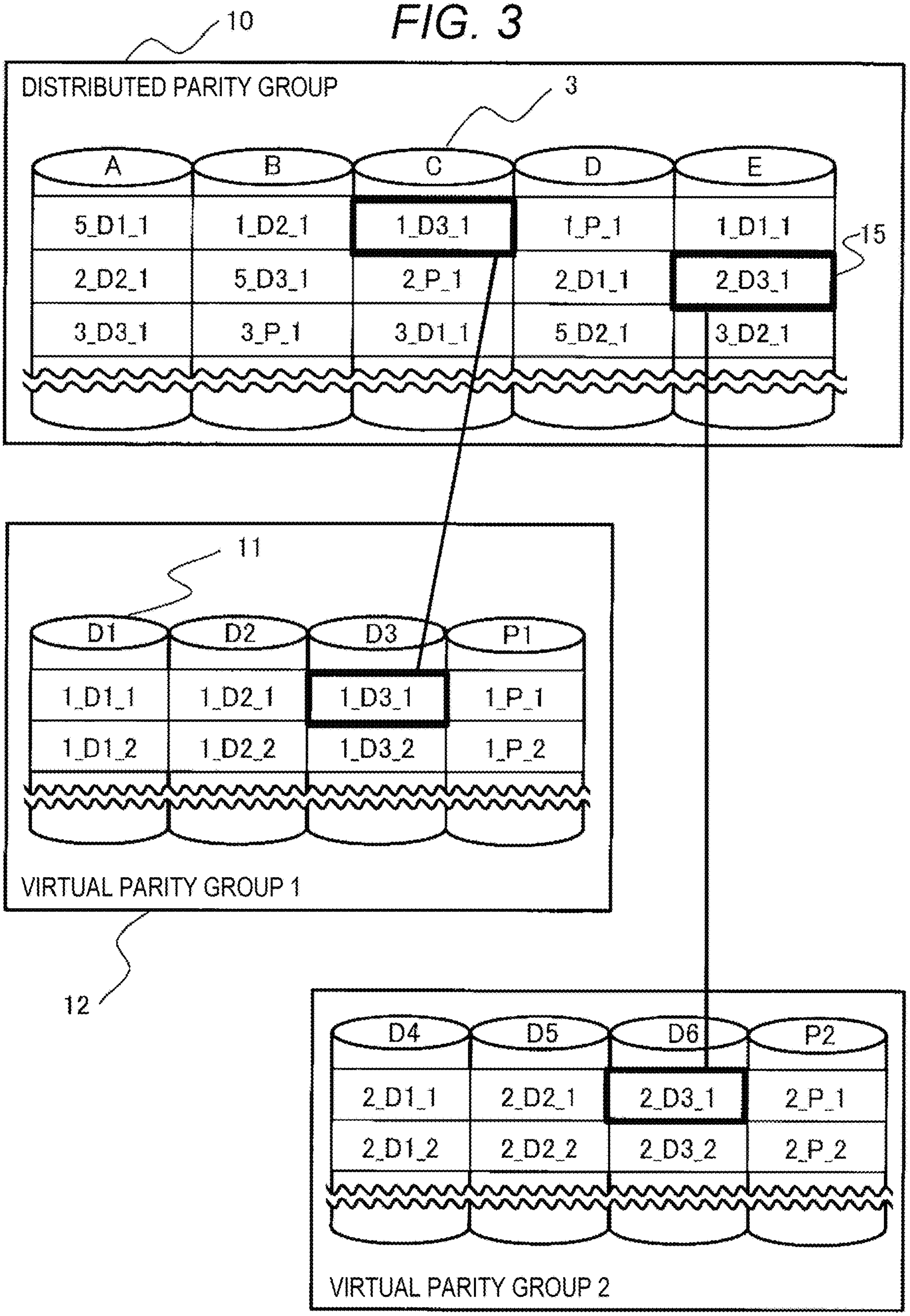
FIG. 3 is a diagram illustrating a concept of the distributed parity group according to a first example.

FIG. 3 illustrates an example of a distributed parity group 10 including five physical drives 3 (A, B, C, D, E).

The storage apparatus 1 divides the storage area of the physical drive 3 in units of fixed lengths called a parcel 15, corresponds the storage area with the storage area of the virtual drive 11, and configures the virtual parity group 12 from a plurality of virtual drives 11. Here, the parcel 15 in the parity cycle in a certain virtual parity group 12 is selected from different physical drives 3.

For example, in FIG. 3, four virtual drives 11 (D1, D2, D3, P1) constitute a virtual parity group 12 of 3D1P. The head parity cycle is composed of parcels "1_D1_1", "1_D2_1", "1_D3_1", and "1_P_1". These parcels 15 are corresponded from different physical drives 3. Specifically, the parcel "1_D1_1" is corresponded with the physical drive E, the parcel "1_D2_1" is corresponded with the physical drive B, the parcel "1_D3_1" is corresponded with the physical drive C, and the parcel "1_P_1" is corresponded with the physical drive D.

As a result, even if any one of the five physical drives 3 fails, there is at most one parcel 15 in which data cannot be read/written in the parity cycle, and data can be restored from the parcel 15 in which data can be read/written.

As described above, in the conventional RAID, it is necessary to increase physical drives in accordance with the number of parity cycles, whereas in the distributed RAID, there is an advantage that physical drives can be increased in units of one by correspondence of the parcels 15.

FIG. 4 is a diagram illustrating an example of a parcel mapping 20 for managing the correspondence of the parcel 15 according to the first example.

The parcel mapping 20 is information for managing correspondence between the storage areas of the virtual drive 11 and the physical drive 3 in the storage controller 2, and is stored in, for example, the memory 5. The parcel mapping 20 stores an entry including a virtual parity group number 21, a virtual drive name 22, an address 23 of the virtual drive, a distributed parity group number 24, an intra-distributed-parity-group drive serial number 25, and an address 26 of the physical drive. One entry corresponds to one parcel 15.

The virtual parity group number 21 is a field for storing an identifier of the virtual parity group 12.

The virtual drive name 22 is a field for storing an identifier of the virtual drive 11.

The address 23 of the virtual drive is a field for storing the position information of the storage area of the virtual drive 11.

The distributed parity group number 24 is a field for storing an identifier of the distributed parity group 10.

The intra-distributed-parity-group drive serial number 25 is a field for storing a serial number to be given to the physical drives 3 constituting the distributed parity group 10 in the increasing order.

The address 26 of the physical drive is a field for storing the position information of the storage area of the physical drive 3 corresponding to the intra-distributed-parity-group drive serial number 25.

FIG. 5 is a diagram illustrating an example of a page management table 30 stored in the storage controller 2.

The page management table 30 is information for managing the storage area of the virtual parity group 12 registered in the pool 13 in the first example, and is, for example, stored in the memory 5. The page management table 30 stores an entry including a page number 31, a virtual parity group number 32, a virtual drive name 33, and an intra-virtual drive address 34. One entry corresponds to one page 16.

The page number 31 is a field for storing an identifier of the page 16.

The virtual parity group number 32 is a field for storing an identifier of the virtual parity group 12.

The virtual drive name 33 is a field for storing an identifier of the virtual drive 11 to which the head position of the storage area in the virtual parity group 12, to which this page corresponds, belongs.

The intra-virtual drive address 34 is a field for storing the head position of the storage area in the virtual parity group 12 to which this page corresponds.

FIG. 6 is a diagram illustrating an example of an address conversion table 40 stored in the storage controller 2.

The address conversion table 40 is information for managing the page 16 allocated to the storage area of the LUN 14 in the first example, and is, for example, stored in the memory 5. The address conversion table 40 stores an entry including an LUN number 41, an LUN address 42, a page unit exclusion 43, and a page number 44. One entry corresponds to a storage area of the LUN 14 having a size of a page 16 unit.

The LUN number 41 is a field for storing an identifier of the LUN 14.

The LUN address 42 is a field for storing position information of a storage area of the LUN 14.

The page unit exclusion 43 is a field for storing information indicating a state in which reading and writing of data from and to a page 16 indicated by a page number 44 to be described later is prohibited when a read/write request from the host 9 is received.

The page number 44 is a field for storing an identifier of the page 16 allocated to the LUN 14.

FIG. 7 is a diagram illustrating an example of a drive operation control table 50 stored in the storage controller 2.

The drive operation control table 50 is information for managing the physical drive in the first example, and is, for example, stored in the memory 5. The drive operation control table 50 stores an entry including a physical drive name 51, a drive state 52, a distributed parity group number 53, an intra-distributed parity group drive serial number 54, and the excess number of times over a write threshold value 55. One entry corresponds to one physical drive 3.

The physical drive name 51 is a field for storing an identifier of the physical drive 3.

The drive state 52 is a field for storing an operation state of the physical drive 3.

The distributed parity group number 53 is a field for storing an identifier of the distributed parity group 10 to which the physical drive 3 belongs.

The drive serial number 54 in the distributed parity group 10 is a field for storing numbers given in the increasing order to the distributed parity group 10 to which the physical drive 3 belongs.

The excess number of times over the write threshold value 55 is a field for storing the number of times the write amount to the physical drive 3 exceeds the threshold value defined by the storage apparatus 1. Here, as an example of the type of the threshold value defined by the storage apparatus 1, there is DWPD provided by an SSD vendor. Tera Byte Written (TBW) that is the total amount of data write may be managed instead of the excess number of times 55 over the write threshold value. As long as the numerical value indicates the likelihood of occurrence of a drive failure due to writing to the physical drive, information different from the DWPD or TBW may be managed.

Figure 8:
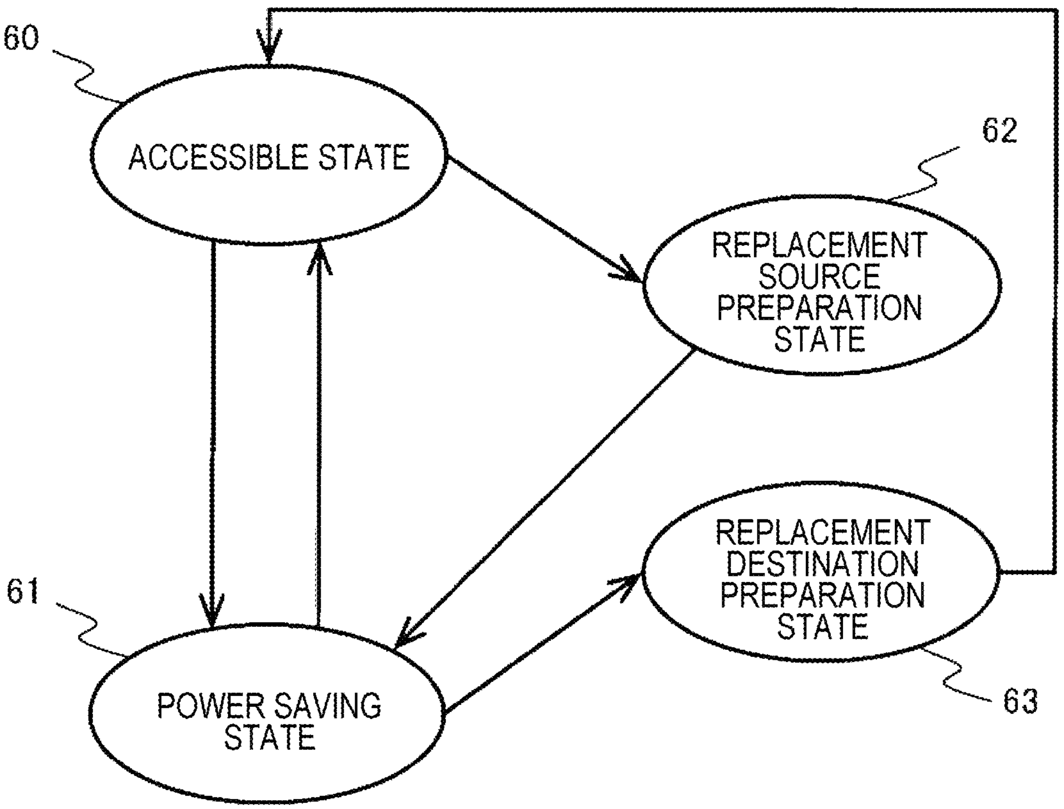
FIG. 8 is a diagram illustrating a state transition of a drive state according to the first example.

FIG. 8 is a state transition diagram illustrating a state that can be stored in the drive state 52 and a transition thereof.

The value stored in the drive state 52 includes an accessible state 60, a power saving state 61, a replacement source preparation state 62, and a replacement destination preparation state 63.

The accessible state 60 indicates a state in which the storage apparatus 1 may issue a data read/write request to the physical drive 3 in response to a request from the host 9.

The power saving state 61 indicates a reception in which the storage apparatus 1 excludes the physical drive 3 from the distributed parity group 10 so that data read/write corresponding to a request from the host 9 does not occur (read/write is prohibited), and then the power saving setting of the physical drive 3 is enabled or power supply is stopped. The state in which the power supply is stopped is also referred to as a power saving state.

The replacement source preparation state 62 indicates that the target of the drive replacement process S2 to be described later is set as the excess number of times 55 over the write threshold value is large. After copying the data of the physical drive 3 to the physical drive 3 in the replacement destination preparation state 63 to be described later, the storage controller 2 (processor 4) sets the state of the physical drive 3 to the power saving state 61.

The replacement destination preparation state 63 indicates that the target of the drive replacement process S2 is set as the excess number of times 55 over the write threshold value is small. After copying the data of the physical drive 3 in the replacement source preparation state 62 described above to the physical drive 3, the storage controller 2 sets the state of the physical drive 3 to the accessible state 60.

The storage controller 2 specifies the address of the physical drive 3 from the address of the LUN 14 using the address conversion table 40, the page management table 30, the parcel mapping 20, and the drive operation control table 50.

Specifically, the storage controller 2 receives a data read/write request together with a number and an address of the LUN 14 from the host 9. At this time, the storage controller 2 removes a fraction of the address of the received LUN. The storage controller 2 specifies an entry having an LUN number 41 and an LUN address 42 matching the number of the received LUN 14 and the address of the LUN 14 from which the fraction has been removed from the address conversion table 40, and acquires a page number 44.

Next, the storage controller 2 specifies an entry having a page number 31 matching the acquired page number 44 from the page management table 30, and acquires a virtual parity group number 32, a virtual drive name 33, and an intra-virtual drive address 34.

Subsequently, the storage controller 2 specifies an entry having the acquired virtual parity group number 32, the virtual drive name 33, the virtual parity group number 21 that matches the intra-virtual drive address 34, the virtual drive name 22, and the address 23 of the virtual drive from the parcel mapping 20, and acquires the distributed parity group number 24, the intra-distributed-parity-group drive serial number 25, and the address 26 of the physical address.

Then, the storage controller 2 specifies an entry having the distributed parity group number 53 and the drive serial number 54 in the distributed parity group 10 that match the acquired distributed parity group number 24 and the intra-distributed-parity-group drive serial number 25 from the drive operation control table 50, and acquires the physical drive name 51.

As described above, the physical drive name 51 indicating the location of the storage area of the physical drive 3 and the address 26 of the physical address can be specified from the number and the address of the LUN 14. Hereinafter, the above specifying process is simply referred to as address specification of the physical drive 3.

Figure 9:
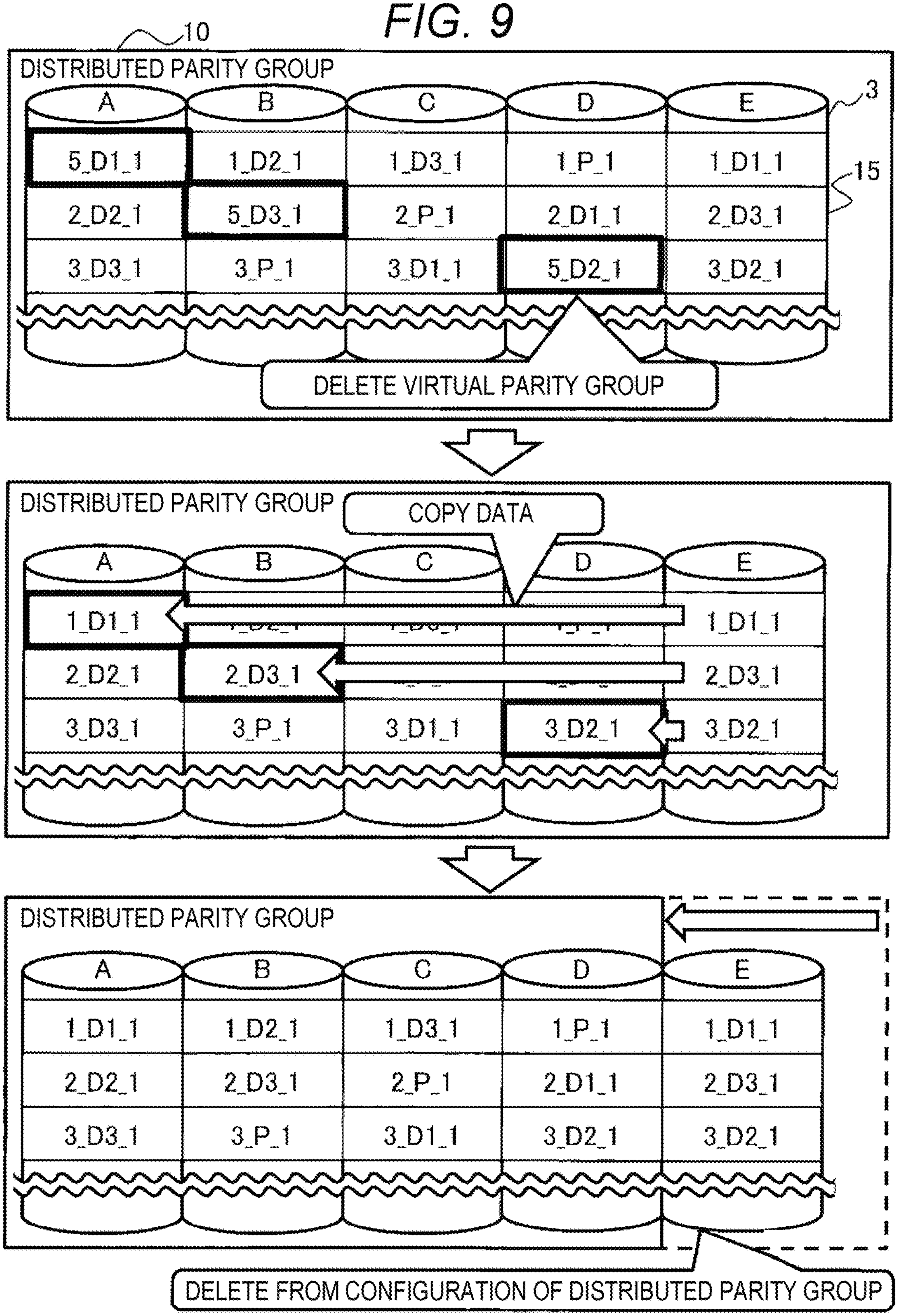
FIG. 9 is a diagram illustrating a flow of a shift process of a drive to a power saving state by bias creation of data arrangement using a distributed parity group according to the first example.

FIG. 9 is a diagram illustrating an operation in which the storage controller 2 sets some of the physical drives 3 to the power saving state 61 in a case where the usage capacity and the read/write load of the physical drives 3 in the distributed parity group 10 are small.

When determining that the data amount or the access load of the LUN 14 is smaller than the sum of the capacity or the processing capacity of the physical drives 3 and the adverse effect on the data read/write of the host 9 is small even if some of the physical drives 3 are stopped, the storage apparatus 1 selects the most recently generated virtual parity group 12, here, the virtual parity group 12 having the largest number, as a deletion target. The deletion of the virtual parity group 12 is intended to release the area of the physical drive associated with the virtual parity group 12, and is performed before the physical drive 3 is stopped.

This is because the parcel mapping 20 changes the correspondence of the parcel 15 so that the data movement amount is minimized each time the virtual parity group 12 is generated, and thus, the data movement amount to be described later can be minimized by deleting the most recently generated virtual parity group 12. However, although the data movement amount increases, an arbitrary virtual parity group 12 may be selected as a deletion target. Neither method affects the main effect of the present example.

The upper stage of FIG. 9 illustrates that the fifth virtual parity group 12 is selected as a deletion target, and the parcels "5_D1_1", "5_D2_1", and "5_D3_1" become deletion targets.

The storage controller 2 specifies an entry matching the virtual drive name 33 and the intra-virtual drive address 34 of the virtual drive 11 corresponding to these parcels 15 from the page management table 30, and acquires the page number 31. The page 16 corresponding to the page number 31 is referred to as a deletion target page.

Next, the storage controller 2 specifies an entry having a page number 44 matching the acquired page number 31 from the address conversion table 40, and sets Yes to the page unit exclusion 43. This is intended to prevent data in the page from being rewritten by a write request from the host 9 during a data copy process between pages to be described later.

Subsequently, the storage controller 2 specifies a page number 31 not included in the page number 44 of the address conversion table 40. The page 16 corresponding to the page number 31 is referred to as an unallocated page. The storage controller 2 copies the data of the deletion target page to the unallocated page, sets the number of the unallocated page to the page number 44 of the address conversion table 40, and sets No to the page unit exclusion 43.

The storage controller 2 copies the data of the physical drive 3 illustrated in the middle stage of FIG. 9 after copying the data to the unallocated page for all the deletion target parcels 15. Specifically, the data of the physical drive 3 (physical drive E) lastly increased to the distributed parity group 10 is copied to the parcel 15 corresponded with the deleted virtual parity group 12, and the parcel mapping 20 is updated.

Then, the storage controller 2 releases the physical drive E from the distributed parity group 10 illustrated in the lower stage of FIG. 9, enables the power saving function of the physical drive E or stops the power supply, and sets the drive state 52 of the entry of the drive operation control table 50 corresponding to the physical drive E to the power saving state 61.

The above is the description for the operation in which the storage apparatus 1 sets the physical drive 3 to the power saving state 61 according to the data amount and the access load of the LUN 14 and suppresses the power consumption.

When the storage apparatus 1 processes a data write request of the host 9 with four physical drives 3 (A, B, C, D), writing to these physical drives is concentrated, and a drive failure may occur.

In order to prevent this, the storage apparatus 1 replaces the physical drive 3 in the accessible state 60 in which the write amount is larger than that of the physical drive 3 in the power saving state 61 and the physical drive 3 in the power saving state 61, and achieves leveling of the drive writes. An example of this operation will be described.

The flow of the leveling process of the number of drive writes using the distributed parity group 10 of the replacement of the physical drives 3 will be described with reference to FIG. 10. Details of the process will be described later.

The storage controller 2 (processor 4) updates the excess number of times 55 over the write threshold value in the drive operation control table 50 in response to the write request issued to the physical drive 3. For example, when the write threshold value is DWPD=1, the total amount of data write to the physical drive 3 is stored in the memory 5, and the difference amount for one day is calculated. If the difference amount exceeds the capacity of the physical drive 3, the value of the excess number of times 55 over the write threshold value is increased by 1.

The storage controller 2 acquires the value of the excess number of times 55 over the write threshold value, and searches for a set of physical drives 3 in which the excess number of times 55 over the write threshold value of the physical drive 3 in the accessible state 60 is larger than the excess number of times 55 over the write threshold of the physical drive 3 in the power saving state 61.

Figure 10:
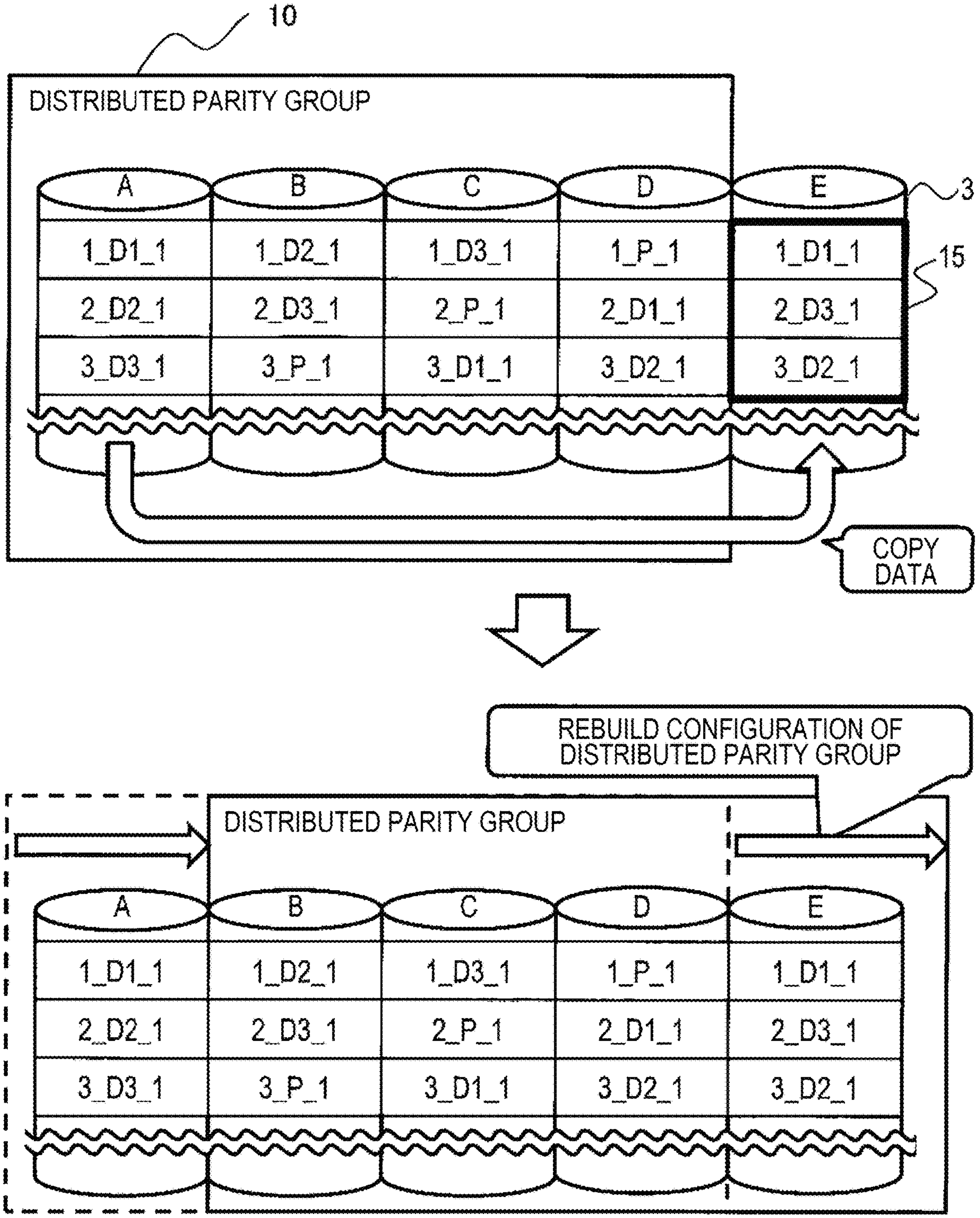
FIG. 10 is a diagram illustrating a flow of leveling process of drive write using the distributed parity group according to the first example.

FIG. 10 illustrates an example in which a set of physical drives A and E can be specified. The storage controller 2 releases the power saving function or starts power supply to the physical drive E. Next, as illustrated in the upper stage of FIG. 10, the storage controller 2 copies the data of the physical drive A to the physical drive E.

Then, as illustrated in the lower stage of FIG. 10, the storage controller 2 adds the physical drive E to the distributed parity group 10 and excludes the physical drive A from the distributed parity group 10. Specifically, the storage controller 2 sets 1 to the distributed parity group number 53 and sets 1 to the drive serial number 54 in the distributed parity group 10 of the entry corresponding to the physical drive E in the drive operation control table 50. Then, "none" is set to the distributed parity group number 53 of the entry corresponding to the physical drive A, and "none" is set to the drive serial number 54 in the distributed parity group 10.

As a result, without changing the parcel mapping 20, the physical drive A having a high possibility of the drive failure due to the data write is replaced with the physical drive E having a low possibility of the drive failure, and the drive write is leveled.

Details of the leveling process will be described below.

FIG. 11 is a diagram illustrating an example of a drive replacement progress management table 70 stored in the storage controller 2. The drive replacement progress management table 70 is information for managing the progress of data copy between the physical drives 3, and is, for example, stored in the memory 5. The drive replacement progress management table 70 stores an entry including a replacement source drive name 71, a replacement destination drive name 72, and a switched address 73. One entry corresponds to a set of the physical drives 3 of the data copy target.

The replacement source drive name 71 is a field for storing an identifier of the physical drive 3 having a large excess number of times 55 over the write threshold value.

The replacement destination drive name 72 is a field for storing an identifier of the physical drive 3 having a small excess number of times 55 over the write threshold value.

The switched address 73 is a field for storing the position information of the storage area where the data copy is completed.

Figure 12:
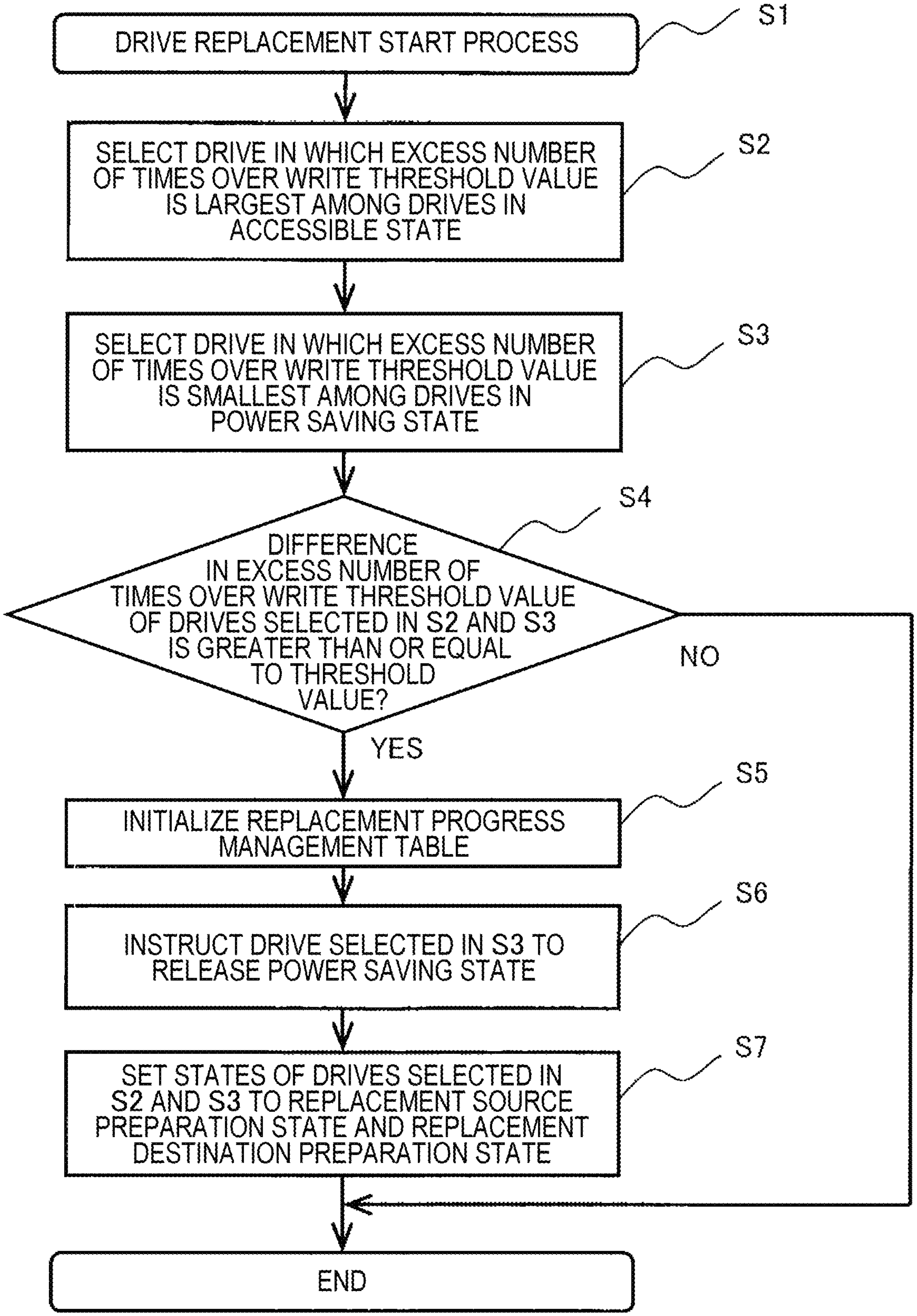
FIG. 12 is a flowchart illustrating a drive replacement start process according to the first example.

FIG. 12 is a flowchart illustrating an example of a drive replacement start process executed by the processor 4.

The processor 4 executes the drive replacement start process S1, for example, periodically or in response to a request from a user of the storage apparatus 1. Here, the term "periodic" is assumed to be a length of time of about one week or month. This is because the expected service life of the SSD is in units of years and the DWPD is a threshold value in units of days, and thus the drive replacement process using the excess number of times over the DWPD as an index may be performed at a frequency of about one week or month. In addition, this cycle may be changed by an instruction or the like of the user of the storage apparatus 1.

Furthermore, in the flowchart of FIG. 12, only one set of physical drives 3 to be replaced is selected. The processor 4 may execute the process S1 a plurality of times in one cycle to start replacement of a plurality of sets of physical drives 3.

The processor 4 lists entries in which the drive state 52 is the accessible state 60 with reference to the drive operation control table 50, and specifies an entry in which the excess number of times 55 over the write threshold value is the largest (step S2).

The processor 4 lists entries in which the drive state 52 is the power saving state 61 with reference to the drive operation control table 50, and specifies an entry in which the excess number of times 55 over the write threshold value is the smallest (step S3). As a result, writing can be effectively leveled between the physical drives 3.

Here, the entry having the largest excess number of times 55 over the write threshold value is selected in step S2, and the entry having the smallest excess number of times 55 over the write threshold value is selected in step S3, but the excess number of times over the write threshold value may be changed according to the operation status of the storage apparatus 1 as long as it is in line with the purpose of searching for a set having a large difference in the excess number of times over the write threshold value of the present invention.

For example, in a situation where the mounted number of physical drives 3 of the storage apparatus 1 is large, and thus all the entries are searched, and other processes to be performed by the processor 4 are adversely affected, a method of selecting an entry in which the excess number of times 55 over the write threshold value is larger than a predetermined first threshold value or smaller than a predetermined second threshold value smaller than the first threshold value may be adopted. Alternatively, a combination of an arbitrary drive in a power saving state and an arbitrary drive in an accessible state in which the excess number of times 55 over the write threshold value is larger than that of the drive in the power saving state may be selected.

Then, the processor 4 calculates a difference between the excess number of times 55 over the write threshold value of the entry selected in step S2 and the excess number of times 55 over the write threshold value of the entry selected in step S3, and determines whether or not the difference is greater than or equal to a replacement threshold value (step S4). As a result, it is possible to avoid the performance of the storage apparatus 1 from deteriorating due to the useless occurrence of replacement of the physical drives 3.

Here, the replacement threshold value may be dynamically changed as long as it conforms to the purpose of selecting one having a large difference in the excess number of times 55 over the write threshold value between the physical drives 3. For example, a difference in the average values of the top 5% and the bottom 5% of the frequency distribution of the excess number of times 55 over the write threshold value may be adopted as the replacement threshold value. Furthermore, step S4 may be omitted.

If the determination result in step S4 is Yes, the processor 4 newly adds an entry to the replacement progress management table 70, and stores a drive name 51 of an entry specified in step S2 in the replacement source drive name 71, a drive name 51 of an entry specified in step S3 in the replacement destination drive name 72, and 0 in the switched address 73 (step S5).

Next, the processor 4 releases the power saving function or starts power supply to the physical drive 3 corresponding to the drive name 51 of the entry specified in step S3 (step S6).

Subsequently, the processor 4 sets the replacement source preparation state 62 to the drive state 52 of the entry specified in step S2 and sets the replacement destination preparation state 63 to the drive state 52 of the entry specified in step S3 (step S7).

On the other hand, if the determination result in step S4 is No, the drive replacement start process S1 is ended.

The above is the description of the process of step S1.

Figure 13:
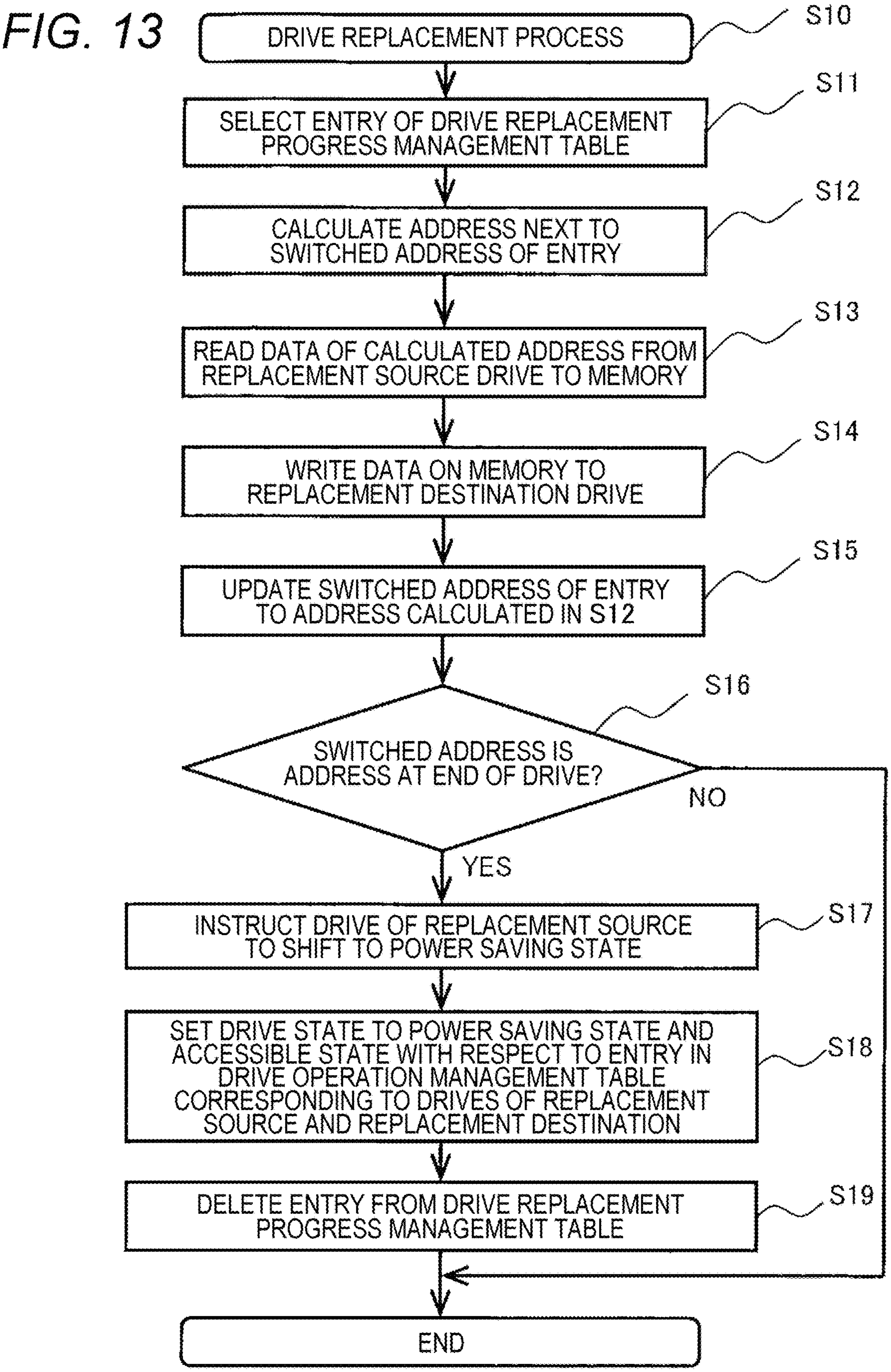
FIG. 13 is a flowchart illustrating a drive replacement process according to the first example.

FIG. 13 is a flowchart illustrating an example of the drive replacement process executed by the processor 4. The processor 4 periodically executes the drive replacement process S10. For example, the processor 4 performs the process of S10 within a range in which the processing performance of the data read/write request from the host 9 is not adversely affected.

The processor 4 selects an entry to be processed from the drive replacement progress management table (step S11). In this selection method, the entry may be always selected from the head of the entry, or each entry may be selected in order.

The processor 4 calculates the next address to be copied from the switched address 73 of the entry selected in step S11 (step S12).

The processor 4 requests the physical drive 3 corresponding to the switching source drive name 71 of the entry selected in step S11 to designate the copy target address calculated in step S12 and read data, and stores the data in the memory 5 (step S13).

The processor 4 requests data write to the physical drive 3 corresponding to the switching destination drive name 72 of the entry selected in step S11 by designating the copy target address calculated in step S12 and the data stored in the memory 5 in step S13 (step S14).

Then, the processor 4 stores the copy target address calculated in step S12 in the switched address 73 of the entry selected in step S11 (step S15).

The processor 4 determines whether or not the switched address 73 stored in step S15 has reached the end of the storage area of the physical drive 3 corresponding to the replacement source drive name 71 (step S16).

If the determination result in step S16 is Yes, the processor 4 enables the setting of the power saving function of the physical drive 3 corresponding to the replacement source drive name 71 or stops the power supply (step S17).

Subsequently, the processor 4 specifies an entry having the physical drive name 51 that matches the replacement source drive name 71 from the drive operation control table 50, and sets the drive state 52 of the entry to the power saving state 61. Furthermore, the processor specifies an entry having the physical drive name 51 that matches the replacement destination drive name 72 from the drive operation control table 50, and sets the drive state 52 of the entry to the accessible state 60 (step S18).

Then, the processor 4 deletes the entry selected in step S11 from the drive replacement progress management table 70.

On the other hand, if the determination result in step S16 is No, the drive replacement process S10 is ended.

The above is the description of the process of step S10.

Figure 14:
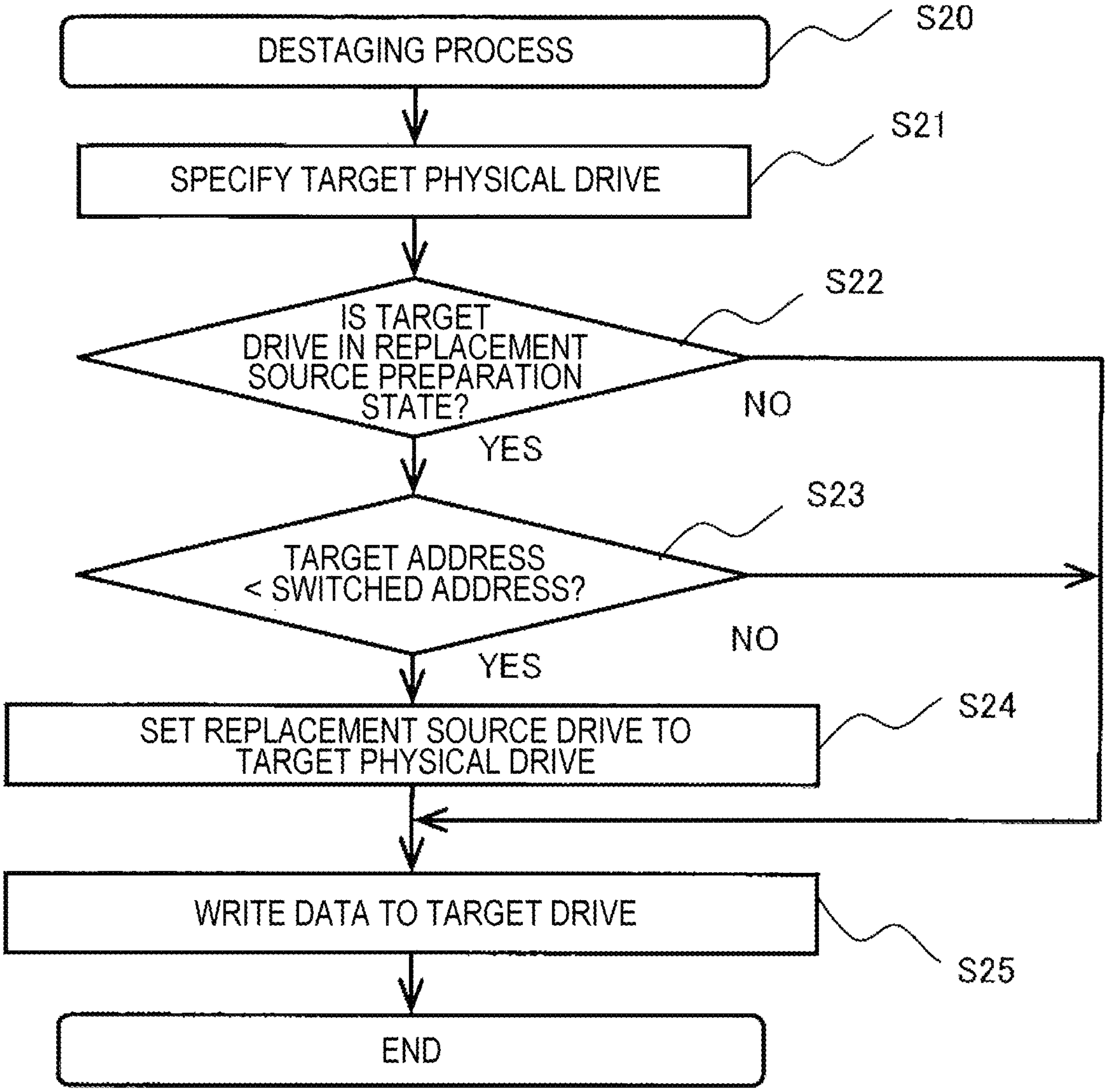
FIG. 14 is a flowchart illustrating a destaging process according to the first example.

FIG. 14 is a flowchart illustrating an example of a destaging process executed by the processor 4.

When receiving a data write request from the host 9, the storage apparatus 1 stores write target data in the memory 5. Thereafter, data is written to the physical drive 3 corresponding to the address of the LUN 14 by the destaging process. FIG. 14 describes an example of a process for writing data to the correct physical drive 3 even when the physical drive 3 of the write destination is in the middle of the drive replacement process.

The processor 4 specifies the number and address of the physical drive 3 to be processed from the number and address of the LUN 14 received from the host 9 (step S21).

The processor 4 refers to the drive state 52 of the entry of the drive operation control table 50 corresponding to the physical drive 3 specified in step S21, and determines whether or not it is the replacement source preparation state 62 (step S22).

If the determination result in step S22 is Yes, the processor 4 specifies an entry having the replacement source drive name 71 that matches the name of the physical drive 3 specified in step S21 from the drive replacement progress management table 70, and acquires the switched address 73. Whether or not the address specified in step S21 is less than the switched address 73 is determined (step S23).

If the determination result in step S23 is Yes, the processor 4 sets the physical drive 3 corresponding to the replacement destination drive name 72 of the entry specified in step S23 as the physical drive 3 to be processed (step S24).

After step S24, if the determination result in step S22 is No, or if the determination result in step S23 is No, the processor 4 requests the physical drive 3 to be processed to perform writing for storing the data in the memory 5 to the address specified in S21 (step S25).

The above is the description of the process of step S20.

Figure 15:
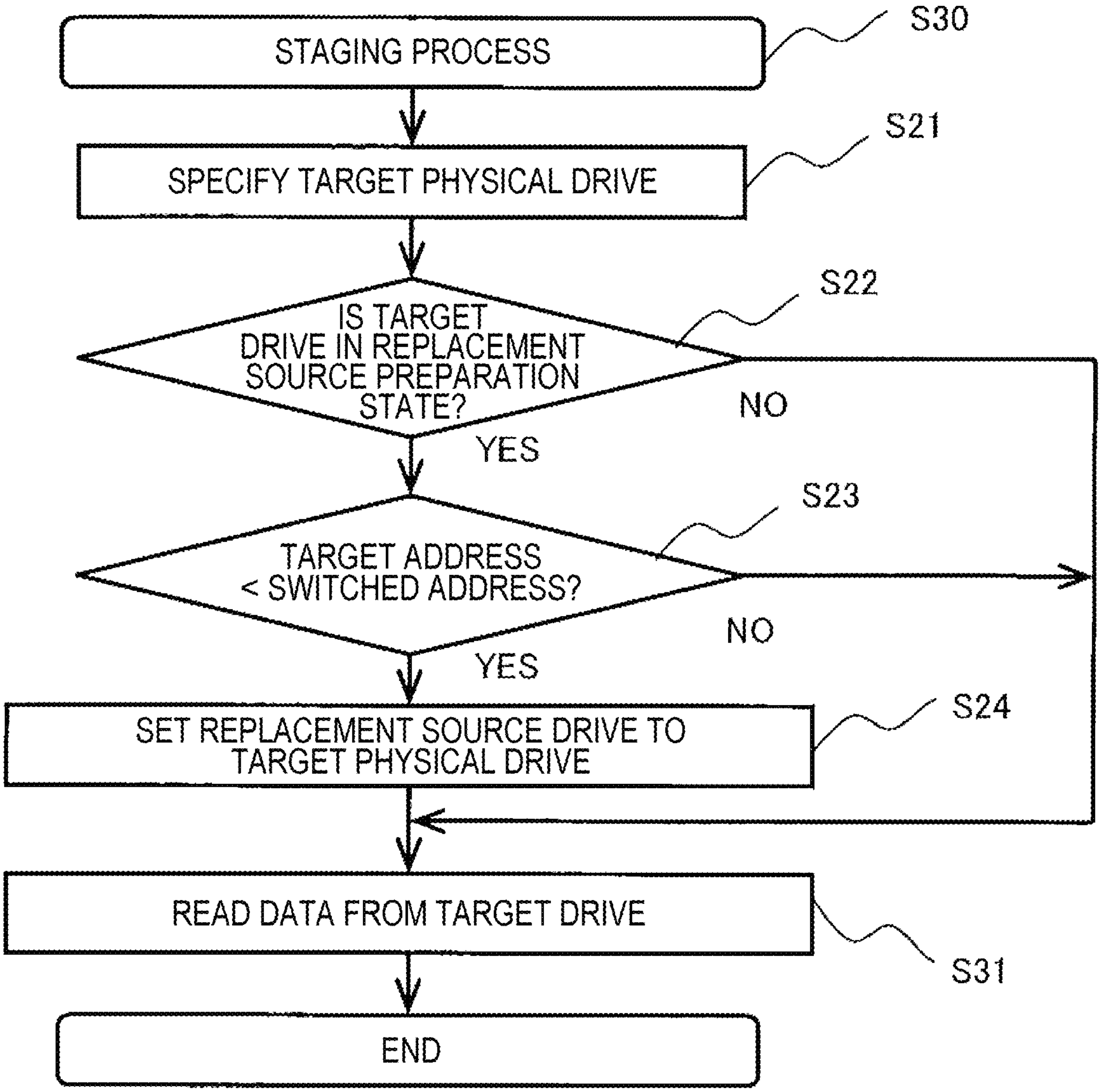
FIG. 15 is a flowchart illustrating a staging process according to the first example.

FIG. 15 is a flowchart illustrating an example of a staging process executed by the processor 4.

When receiving the data read request from the host 9, the storage apparatus 1 searches whether the read target data is stored in the memory 5. When determined that the read target data is not stored in the memory 5 as a result of the search, data is read from the physical drive 3 corresponding to the address of the LUN 14 by the staging process. FIG. 15 illustrates an example of a process for reading data from the correct physical drive 3 even when the physical drive 3 of the write destination is in the middle of the drive replacement process.

However, since there is a portion where the same process as the flowchart of FIG. 14 is executed, a difference from FIG. 14 will be mainly described.

The processor 4 executes the processes from step S21 to step S24 illustrated in FIG. 14 to determine the physical drive 3 to be subjected to the reading process. Then, the processor 4 requests the physical drive 3 to be subjected to the reading process to perform reading for storing data in the memory 5 from the address specified in S21 (step S31).

The above is the description of the process of step S30.

As described above, the method has been described in which the storage apparatus 1 suppresses the occurrence of the drive failure due to the increase in the number of data write to the specific physical drive 3 by, while reducing the power consumption by excluding the physical drive 3 from the distributed parity group 10 and setting the power saving state thereto, replacing the physical drive 3 belonging to the distributed parity group 10 with the physical drive 3 set to the power saving state.

By utilizing the distributed RAID, the physical drive 3 can be set a power saving state in units of one, and data read/write do not occur in the physical drive 3, and thus power supply to the physical drive can be stopped, and the effect of reducing the power consumption can be further enhanced.

Second Example

An example of the present patent in a conventional RAID configuration will be described. The main differences from the first example are that the physical drive 3 is set to the power saving state and the drive replacement process is performed in units of parity groups 17.

In the present example, it is advantageous that application can be made even to the storage apparatus 1 having no distributed RAID function.

Hereinafter, differences from the first example will be mainly described. The contents not described in the present example conform to the configuration and process in the first example.

The storage controller 2 (processor 4) configures a parity group 17 from a plurality of physical drives 3 using a conventional RAID technology.

Subsequently, the storage controller 2 registers the parity group 17 in the pool 13. Here, a method of registering the LUN 14 created from the parity group 17 in the pool 13 may be adopted.

For example, when determining that the data amount and the access load of the LUN 14 are smaller than the sum of the capacity and the processing capacity of the physical drive 3 and the adverse effect on the data read/write of the host 9 is small even if the physical drive 3 is stopped in units of parity groups 17, the storage controller 2 selects the parity group 17 having the largest average value of the excess number of times 55 over the write threshold value as the deletion target. This is intended to reduce the frequency of replacement process in units of parity groups 17 to be described later. However, in a case where the storage apparatus 1 is operated for a long period of time, this effect may be limited, and thus an arbitrary parity group 17 may be selected. Alternatively, one of the parity groups 17 in which the average value of the excess number of times 55 over the write threshold value exceeds the predetermined threshold value may be selected.

The storage controller 2 copies the data of the page 16 associated with the parity group 17 to be deleted to the page 16 of the parity group 17 that is not the deletion target, excludes the parity group 17 to be deleted from the pool 13, and sets the power saving function of the physical drive 3 belonging to the parity group 17 to be deleted to enable or stops the power supply.

Figure 16:
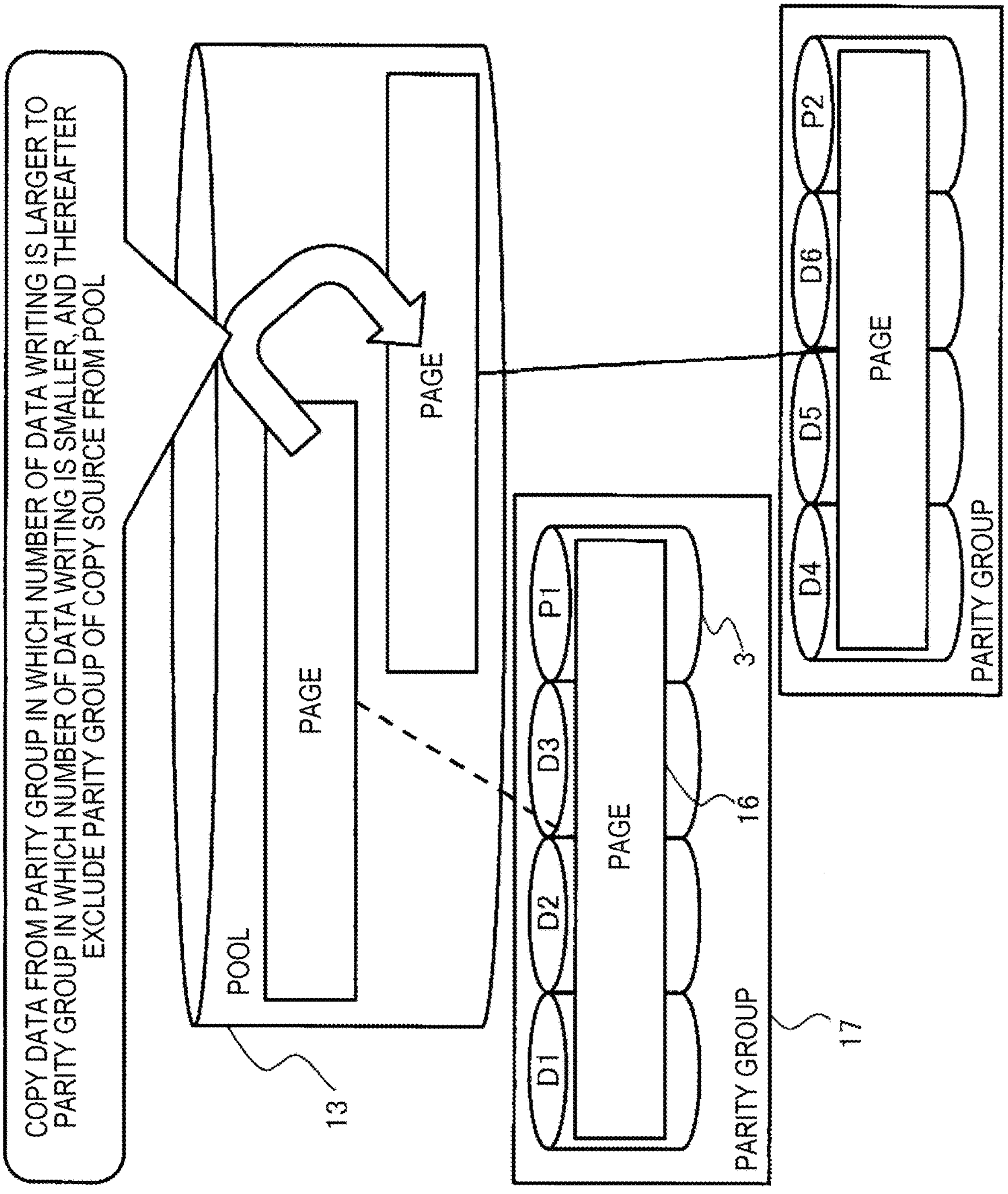
FIG. 16 is a diagram illustrating a concept of a leveling process of the number of drive writes using a parity group according to a second example.

The outline of the operation in the present example will be described with reference to FIG. 16.

The storage apparatus 1 manages the excess number of times 55 over the data write threshold value of each physical drive 3.

The storage controller 2 periodically selects a parity group 17 in which the average of the excess number of times 55 over the data write threshold value of the physical drive 3 in the parity group 17 is larger and a parity group 17 in which the average is smaller, and calculates a difference therebetween.

When the calculated difference is larger than or equal to a certain value, the storage controller 2 sets the power saving function of the physical drive 3 belonging to the parity group 17 in which the average of the excess number of times 55 over the data write threshold value is small to disable or starts the power supply.

Then, the storage controller 2 copies the data of the page 16 belonging to the parity group 17 in which the excess number of times 55 over the data write threshold value is large to the page 16 belonging to the parity group 17 in which the excess number of times 55 over the data write threshold value is small, and switches the page allocation information. After repeating this process in units of pages, the power saving function of the physical drive 3 belonging to the parity group 17 in which the average of the excess number of times 55 over the data write threshold value is large is set to enable or the power supply is stopped.

Hereinafter, details of the present example will be described.

FIG. 17 is a diagram illustrating an example of a parity group operation control table 80 stored in the storage controller 2. The parity group operation control table 80 is information for managing the parity group 17 in the present example, and is, for example, stored in the memory 5. The parity group operation control table 80 stores an entry including a parity group number 81, a parity group state 82, a drive name 83, and an excess number of times 84 over a write threshold value. One entry corresponds to one party group 17.

The parity group number 81 is a field for storing an identifier of the parity group 17.

The parity group state 82 is a field for storing an operation state of the parity group 17.

The drive name 83 is a field for storing an identifier of the physical drive 3 belonging to the parity group 17.

The excess number of times 84 over the write threshold value is a field for storing an average value of the number of times the write amount to the physical drive 3 corresponding to the drive name 83 exceeds a defined threshold value of the storage apparatus 1. However, the purpose of this field is to express the possibility of a drive failure due to data write, and a statistical value different from the average value may be used for this purpose. For example, a maximum value may be used.

Furthermore, in the present example, the page management table 30 and the address conversion table 40 described in the first example are also used.

Figure 18:
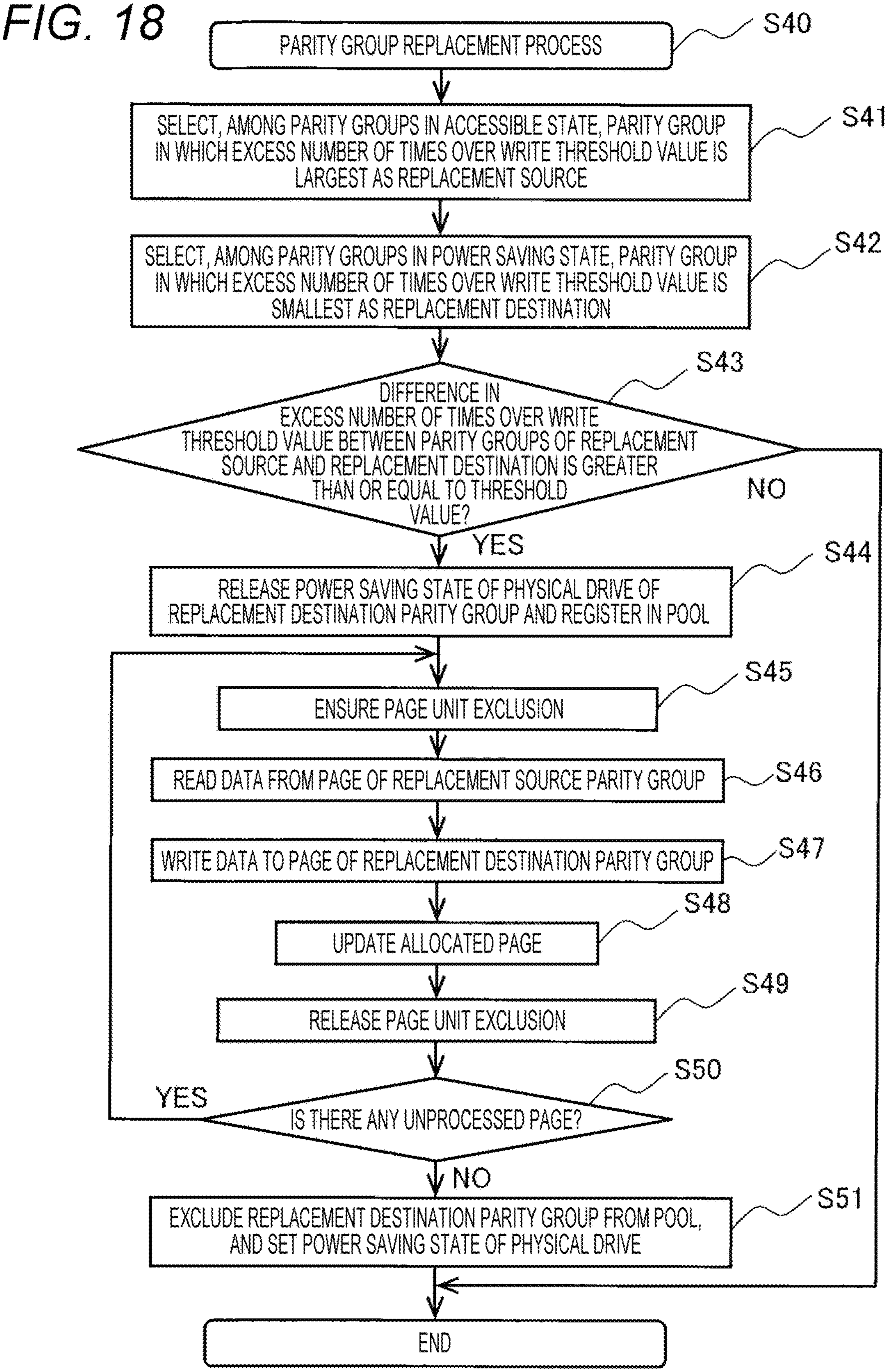
FIG. 18 is a flowchart illustrating a parity group replacement process according to the second example.

FIG. 18 is a flowchart illustrating an example of a parity group replacement process executed by the processor 4.

Similarly to the drive replacement start process S1 described in the first example, the processor 4 executes the parity group replacement process S40 periodically or according to an instruction from a storage user.

The processor 4 lists entries in which the parity group state 82 is the accessible state 60 with reference to the parity group operation control table 80, and selects an entry having the largest excess number of times 83 over the write threshold value as a replacement source parity group 17 (step S41).

The processor 4 lists entries in which the parity group state 82 is the power saving state 61 with reference to the parity group operation control table 80, and selects an entry having the smallest excess number of times 83 over the write threshold value as a replacement destination parity group 17 (step S42).

Here, similarly to steps S2 and S3 in the first example, step S41 and step S42 may be selected by a method other than the method of selecting the entry having the largest or smallest excess number of times.

Then, the processor 4 calculates a difference in the excess number of times 83 over the write threshold value between the replacement source parity group 17 and the replacement destination parity group 17, and determines whether or not the difference is larger than or equal to the replacement threshold value (step S43).

Here, the threshold value used for the determination in step S43 may be dynamically changed as in step S4. Furthermore, step S43 may be omitted.

If the determination result in step S43 is Yes, the processor 4 releases the power saving function or starts power supply to the physical drive 3 belonging to the replacement destination parity group 17, and registers the same in the pool 13 (step S44).

Next, the processor 4 specifies an entry having the virtual parity group number 32 that matches the number of the replacement source parity group 17 from the page management table 30 and acquires the page number 31. The entry having the page number 44 that matches the acquired page number 31 is specified from the address conversion table 40, and Yes is set to the page unit exclusion 43 (step S45). As a result, read/write of data with respect to the LUN address 42 of the entry is temporarily stopped.

Subsequently, the processor 4 reads the data of the page selected in step S45 from the physical drive 3 to the memory 5 (step S46).

The processor 4 specifies the unallocated page 16 belonging to the replacement destination parity group 17 from the page management table 30 and the address conversion table 40, and writes the data in the memory read in step S46 to the physical drive 3 corresponding to the unallocated page (step S47).

The processor 4 stores the number of the unallocated page 16 specified in step S47 in the page number 44 of the entry of the address conversion table 40 specified in step S45 (step S48).

Then, the processor 4 sets No to the page unit exclusion 43 of the entry of the address conversion table 40 specified in step S45 (step S49). As a result, data can be read/written using the page 16 belonging to the replacement destination parity group 17.

Thereafter, the processor 4 determines whether or not there is a page 16 belonging to the replacement source parity group 17 that has not been processed (step S50).

If the determination result in step S50 is Yes, the process of step S45 is executed.

If the determination result in step S50 is No, the processor 4 excludes the replacement source parity group 17 from the pool 13, and sets the power saving function to enable or stops the power supply with respect to the physical drive 3 belonging to the replacement source parity group 17 (step S51).

On the other hand, if the determination result in step S43 is No, the parity group replacement process S40 is ended.

The above is the description of the process of step S40.

As described above, a method has been described in which the storage apparatus 1 excludes the parity group 17 configured by the conventional RAID technology from the pool 13, and periodically replaces the parity group 17 while reducing power consumption by setting the physical drive 3 belonging to the parity group 17 to the power saving state, thus suppressing occurrence of a drive failure due to an increase in data write to a specific physical drive 3.

On the premise of the conventional RAID technology, it is advantageous that application can be made even to the storage apparatus 1 having no distributed RAID function.

Third Example

An example in a case where there is a difference in write frequency between data in a conventional RAID configuration will be described. The main difference from the second example is that, in the third example, data having a high access frequency is concentrated in some parity groups 17, and the physical drives 3 belonging to the remaining parity groups 17 are set to the power saving state without being excluded from the pool 13. Note that a part of or all of the selected data may be moved regardless of the access frequency.

Since a data read/write request from the host 9 can be generated in the physical drives 3 set to the power saving state, the power saving state is set to these physical drives 3 in a range in which data can be read/written without preparation. For example, the APST function provided by the SSD is used. As a result, data can be read/written while maintaining the power saving state, and power supply to the physical drive 3 is maintained in the power saving state.

In the present example, there is an advantage that the power consumption can be reduced even in a situation where the capacity of the pool 13 is insufficient with respect to the capacity of the LUN 14 by not excluding the parity group 17 from the pool 13.

Hereinafter, the difference from the second example will be mainly described. The contents not described in the present example conform to the configuration and process in the second example.

FIG. 19 is a diagram illustrating an example of a page management table 90 according to the present example stored in the storage controller 2.

The page management table 90 is information for managing the page 16 in the present example, and is, for example, stored in the memory 5. The page management table 90 stores an entry including a page number 31, a virtual parity group number 32, an intra-parity group address 93, and a data write frequency 94. One entry corresponds to one page 16.

Since the page number 31 and the virtual parity group number 32 have been described in the first example, the description thereof will be omitted. The intra-parity group address 93 indicates an address in the parity group of the page 16 corresponding to the page number 31.

The data write frequency 94 is a field for storing information indicating the number of data write to the page 16 corresponding to the page number 31. Here, the data write frequency may be a relative value between the pages 16, or the number of write requests from the host 9 may be stored as an absolute value. For example, in all the pages or each parity group, the specified ratio of the highest write frequency may be "high", and when the write frequency exceeds a predetermined threshold value, it may be defined as "high".

Furthermore, in the present example, the address conversion table 40 described in the first example and the parity group operation control table 80 described in the second example are also used.

Figure 20:
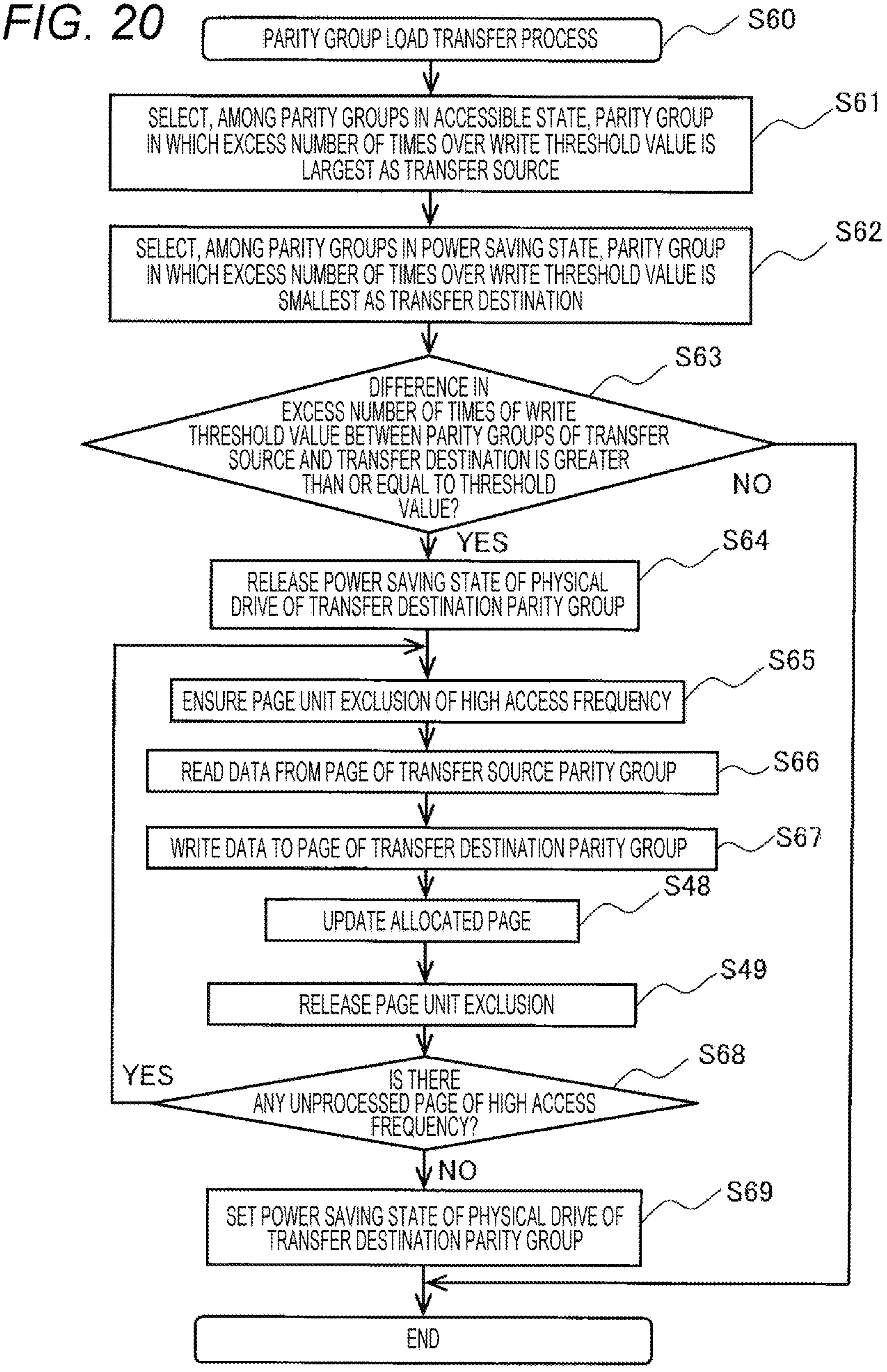
FIG. 20 is a flowchart illustrating a parity group load transfer process according to the third example.

FIG. 20 is a flowchart illustrating an example of a parity group load transfer process executed by the processor 4.

Similarly to the parity group replacement process S40 described in the second example, the processor 4 executes the parity group load transfer process S60 periodically or according to an instruction of the storage user.

The processor 4 lists entries in which the parity group state 82 is the accessible state 60 with reference to the parity group operation control table 80, and selects an entry having the largest excess number of times 83 over the write threshold value as a transfer source parity group 17 (step S61).

The processor 4 lists entries in which the parity group state 82 is the power saving state 61 with reference to the parity group operation control table 80, and selects an entry having the smallest excess number of times 83 over the write threshold value as a transfer destination parity group 17 (step S62).

Here, similarly to steps S41 and S42 in the second example, step S61 and step S62 may be selected by a method other than the method of selecting the entry having the largest or smallest excess number of times.

Then, the processor 4 calculates a difference in the excess number of times 83 over the write threshold value between the transfer source parity group 17 and the transfer destination parity group 17, and determines whether or not the difference is larger than or equal to the threshold value (step S63).

Here, the threshold value used for the determination in step S63 may be dynamically changed as in step S43.

If the determination result in step S63 is Yes, the processor 4 releases the power saving function for the physical drive 3 belonging to the transfer destination parity group 17 (step S64).

Next, the processor 4 specifies an entry having the virtual parity group number 32 that matches the number of the transfer source parity group 17 and in which the data write frequency 94 is "high" from the page management table 90, and acquires the page number 31. The entry having the page number 44 that matches the acquired page number 31 is specified from the address conversion table 40, and Yes is set to the page unit exclusion 43 (step S65). As a result, read/write of data with respect to the LUN address 42 of the entry is temporarily stopped.

The processor 4 reads the data of the page selected in step S65 from the physical drive 3 to the memory 5 (step S66).

The processor 4 specifies the unallocated page 16 belonging to the transfer destination parity group 17 from the page management table 30 and the address conversion table 40, and writes the data in the memory read in step S66 to the physical drive 3 corresponding to the unallocated page (step S67).

Subsequently, the processor 4 executes the processes of step S48 and step S49 described in the second example.

Thereafter, the processor 4 determines whether or not there is a page whose data write frequency 94 is "high" and which is unprocessed among the pages 16 belonging to the transfer source parity group 17 (step S68).

If the determination result in step S68 is Yes, the process of step S65 is executed.

If the determination result in step S68 is No, the processor 4 sets the power saving function to enable with respect to the physical drive 3 belonging to the transfer source parity group 17 (step S69).

On the other hand, if the determination result in step S63 is No, the parity group load transfer process S60 is ended.

The above is the description of the process of step S60.

As described above, a method has been described in which the storage apparatus 1 moves data having a high data write frequency between the parity groups 17 configured by the conventional RAID technology to suppress the occurrence of a drive failure due to an increase in data write to a specific physical drive 3 while reducing the power consumption by setting the physical drives 3 belonging to the parity group 17 having a low access frequency to the power saving state.

The power consumption can be reduced even in a situation where the capacity of the pool 13 is insufficient with respect to the capacity of the LUN 14 by not excluding the parity group 17 from the pool 13.

Note that the present invention is not limited to the embodiments described above, and includes various modified examples. For example, the embodiments described above have been described in detail for the sake of easy understanding of the present invention, and are not necessarily limited to those having all the described configurations. In addition, a part of the configuration of a certain example can be replaced with a configuration of another example, and the configuration of a certain example can be added with the configuration of another example. Furthermore, for a part of the configuration of each example, other configurations can be added, deleted, and replaced.

In addition, some or all of the above-described configurations, functions, processing units, and the like may be realized by hardware, for example, by designing with an integrated circuit. In addition, each of the above-described configurations, functions, and the like may be realized by software by a processor interpreting and executing a program for realizing each function. Information such as a program, a table, and a file for realizing each function can be stored in a recording device such as a memory, a hard disk, and an SSD, or a recording medium such as an IC card and an SD card.

In addition, control lines and information lines that are considered necessary for the description are shown, and not all control lines and information lines are necessarily shown in terms of product. In practice, it may be considered that almost all the configurations are connected to each other.

What is claimed is:

1. A storage apparatus comprising:
a plurality of physical drives; and
a storage controller configured to control access to the plurality of physical drives,
wherein the storage controller is configured to:
record statistical information related to data write of each of the plurality of physical drives, and
execute a replacement process between one or more first physical drives in a non-power saving state and one or more second physical drives in a power saving state, the one or more second physical drives being different from the first physical drives and having the statistical information indicating fewer writes than the one or more first physical drives,
wherein the replacement process includes:
setting the one or more second physical drives to the non-power saving state,
moving data from the one or more first physical drives to the one or more second physical drives set in the non-power saving state, and
setting the one or more first physical drives from which the data has been moved to the power saving state,
wherein some of the plurality of physical drives constitutes a distributed parity group,
wherein the storage controller is configured to define one or more virtual parity groups including a plurality of virtual drives,
wherein data of the virtual parity group is stored in a storage area allocated from the distributed parity group, and
wherein the replacement process includes;
setting the second physical drives outside the distributed parity group to the non-power saving state, and then adding the second physical drives to the distributed parity group, and
excluding the first physical drives included in the distributed parity group from the distributed parity group, and then setting the first physical drives to the power saving state.

2. The storage apparatus according to claim 1, wherein the power saving state of the first physical drives and the second physical drives is a state in which power supply to the physical drives is stopped.

3. The storage apparatus according to claim 1, wherein the storage controller determines to execute the replacement process when a difference in writing between the one or more first physical drives and the one or more second physical drives is greater than or equal to a threshold value.

4. A storage apparatus comprising:
a plurality of physical drives; and
a storage controller configured to control access to the plurality of physical drives,
wherein the storage controller is configured to:
record statistical information related to data write of each of the plurality of physical drives, and
execute a replacement process between one or more first physical drives in a non-power saving state and one or more second physical drives in a power saving state, the one or more second physical drives being different from the first physical drives and having the statistical information indicating fewer writes than the one or more first physical drives, wherein the replacement process includes:
setting the one or more second physical drives to the non-power saving state,
moving data from the one or more first physical drives to the one or more second physical drives set in the non-power saving state, and
setting the one or more first physical drives from which the data has been moved to the power saving state,
wherein the plurality of physical drives include a plurality of parity groups,
wherein the one or more first physical drives configure a first parity group,
wherein the one or more second physical drives configure a second parity group, and
wherein the replacement process includes;
setting the second parity group to the non-power saving state, and then adding the second parity group to a pool, and
excluding the first parity group included in the pool from the pool, and then setting the first parity group to the power saving state.

5. The storage apparatus according to claim 4, wherein the power saving state of the first physical drives and the second physical drives is a state in which power supply to the physical drives is stopped.

6. A storage apparatus comprising:
a plurality of physical drives; and
a storage controller configured to control access to the plurality of physical drives,
wherein the storage controller is configured to:
record statistical information related to data write of each of the plurality of physical drives, and
execute a replacement process between one or more first physical drives in a non-power saving state and one or more second physical drives in a power saving state, the one or more second physical drives being different from the first physical drives and having the statistical information indicating fewer writes than the one or more first physical drives,
wherein the replacement process includes:
setting the one or more second physical drives to the non-power saving state,
moving data from the one or more first physical drives to the one or more second physical drives set in the non-power saving state, and
setting the one or more first physical drives from which the data has been moved to the power saving state,
wherein the plurality of physical drives include a plurality of parity groups,
wherein the one or more first physical drives configure a first parity group,
wherein the one or more second physical drives configure a second parity group,
wherein the first parity group and the second parity group are included in one pool,
wherein the replacement process includes:
setting the second parity group to the non-power saving state, and then moving data determined to have a high write frequency in the first parity group to the second parity group set in the non-power saving state; and
after moving the data, setting the first parity group from which the data has been moved to the power saving state, and
wherein the first parity group in the power saving state are in a state in which data is readable/writable.

7. A method of a storage apparatus including: a plurality of physical drives; and a storage controller configured to control access to the plurality of physical drives, wherein the method comprises:
recording statistical information related to data write of each of the plurality of physical drives; and
executing a replacement process between one or more first physical drives in a non-power saving state and one or more second physical drives in a power saving state, the one or more second physical drives being different from the first physical drives and having the statistical information indicating fewer writes than the one or more first physical drives;
wherein the replacement process includes:
setting the one or more second physical drives to the non-power saving state,
moving data from the one or more first physical drives to the one or more second physical drives set in the non-power saving state, and
setting the one or more first physical drives from which the data has been moved to the power saving state,
wherein some of the plurality of physical drives constitutes a distributed parity group,
wherein the storage controller defines one or more virtual parity groups including a plurality of virtual drives,
wherein data of the virtual parity group is stored in a storage area allocated from the distributed parity group, and
wherein the replacement process includes:
setting the second physical drives outside the distributed parity group to the non-power saving state, and then adding the second physical drives to the distributed parity group, and
excluding the first physical drives included in the distributed parity group from the distributed parity group, and then setting the first physical drives to the power saving state.

8. The method according to claim 7, wherein the power saving state of the first physical drives and the second physical drives is a state in which power supply to the physical drives is stopped.

9. The method according to claim 8, wherein the replacement process is executed when a difference in writing between the one or more first physical drives and the one or more second physical drives is greater than or equal to a threshold value.

10. A method of a storage apparatus including: a plurality of physical drives; and a storage controller configured to control access to the plurality of physical drives, wherein the method comprises:
recording statistical information related to data write of each of the plurality of physical drives; and
executing a replacement process between one or more first physical drives in a non-power saving state and one or more second physical drives in a power saving state, the one or more second physical drives being different from the first physical drives and having the statistical information indicating fewer writes than the one or more first physical drives,
wherein the replacement process includes:
setting the one or more second physical drives to the non-power saving state,
moving data from the one or more first physical drives to the one or more second physical drives set in the non-power saving state, and setting the one or more first physical drives from which the data has been moved to the power saving state, wherein the plurality of physical drives include a plurality of parity groups, wherein the one or more first physical drives configure a first parity group, wherein the one or more second physical drives configure a second parity group, and wherein the replacement process includes:

setting the second parity group to the non-power saving state, and then adding the second parity group to a pool, and excluding the first parity group included in the pool from the pool, and then setting the first parity group to the power saving state.

11. The method according to claim 10, wherein the power saving state of the first physical drives and the second physical drives is a state in which power supply to the physical drives is stopped.

12. A method of a storage apparatus including: a plurality of physical drives; and a storage controller configured to control access to the plurality of physical drives, wherein the method comprises:

recording statistical information related to data write of each of the plurality of physical drives; and executing a replacement process between one or more first physical drives in a non-power saving state and one or more second physical drives in a power saving state, the one or more second physical drives being different from the first physical drives and having the statistical information indicating fewer writes than the one or more first physical drives, wherein the replacement process includes:

setting the one or more second physical drives to the non-power saving state, moving data from the one or more first physical drives to the one or more second physical drives set in the non-power saving state, and setting the one or more first physical drives from which the data has been moved to the power saving state, wherein the plurality of physical drives include a plurality of parity groups, wherein the one or more first physical drives configure a first parity group, wherein the one or more second physical drives configure a second parity group, wherein the first parity group and the second parity group are included in one pool, wherein the replacement process includes:

setting the second parity group to the non-power saving state, and then moving data determined to have a high write frequency in the first parity group to the second parity group set in the non-power saving state; and after moving the data, setting the first parity group from which the data has been moved to the power saving state, and wherein the first parity group in the power saving state are in a state in which data is readable/writable.

* * * * *